(12) United States Patent
Sumino et al.

(10) Patent No.: US 7,590,076 B2
(45) Date of Patent: Sep. 15, 2009

(54) SWITCHING APPARATUS

(75) Inventors: Satoshi Sumino, Kawasaki (JP); Kazuto Nishimura, Kawasaki (JP); Akihiro Hata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 857 days.

(21) Appl. No.: 10/733,187

(22) Filed: Dec. 11, 2003

(65) Prior Publication Data
US 2004/0120269 A1 Jun. 24, 2004

(30) Foreign Application Priority Data
Dec. 13, 2002 (JP) ............................. 2002-361728

(51) Int. Cl.
*H04L 12/28* (2006.01)
(52) U.S. Cl. .................. 370/255; 370/395.31
(58) Field of Classification Search ................ 370/389, 370/401, 218, 395.31, 360, 351, 392, 255, 370/395.32, 400
See application file for complete search history.

(56) References Cited

U.S. PATENT DOCUMENTS

| | | | |
|---|---|---|---|
| 6,111,874 A * | 8/2000 | Kerstein | 370/389 |
| 6,256,314 B1 * | 7/2001 | Rodrig et al. | 370/401 |
| 6,308,218 B1 * | 10/2001 | Vasa | 709/238 |
| 6,633,567 B1 * | 10/2003 | Brown | 370/395.3 |
| 6,779,043 B1 * | 8/2004 | Crinion | 709/249 |
| 6,934,260 B1 * | 8/2005 | Kanuri | 370/255 |
| 6,963,575 B1 * | 11/2005 | Sistanizadeh et al. | 370/404 |
| 7,012,890 B2 * | 3/2006 | Yazaki et al. | 370/229 |
| 7,046,629 B2 * | 5/2006 | Wu et al. | 370/230.1 |
| 7,158,519 B2 * | 1/2007 | Kanakubo | 370/392 |
| 7,415,022 B2 * | 8/2008 | Kadambi et al. | 370/392 |
| 2001/0028651 A1 * | 10/2001 | Murase | 370/392 |
| 2003/0031190 A1 * | 2/2003 | Ohnishi | 370/401 |
| 2003/0081606 A1 * | 5/2003 | Tamura et al. | 370/392 |
| 2003/0123462 A1 * | 7/2003 | Kusayanagi | 370/401 |
| 2004/0122929 A1 * | 6/2004 | Wadekar | 709/223 |

FOREIGN PATENT DOCUMENTS

| | | |
|---|---|---|
| JP | 7-254912 | 10/1995 |
| JP | 11-341039 | 12/1999 |

* cited by examiner

*Primary Examiner*—Kwang B Yao
*Assistant Examiner*—Candal Elpenord
(74) *Attorney, Agent, or Firm*—Katten Muchin Rosenman LLP

(57) ABSTRACT

A switching apparatus for learning a source address set in a packet in an address learning table and delivering a packet on the basis of an address learned in the address learning table includes an address learning unit for limiting a number of learned addresses such that a number of learned addresses for each user group in the address learning table is equal to or less than an address learning upper limit value for the user group.

17 Claims, 22 Drawing Sheets

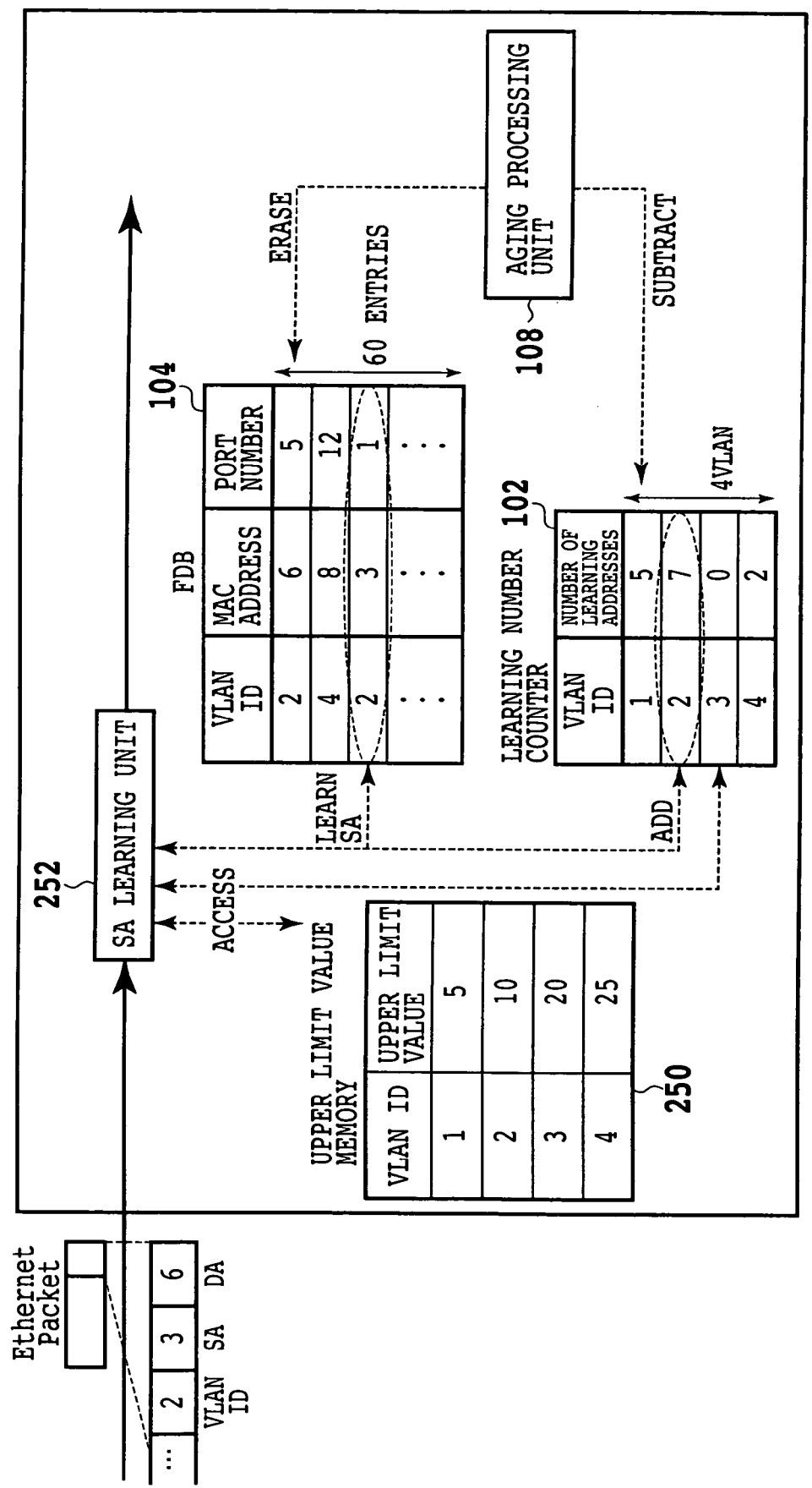

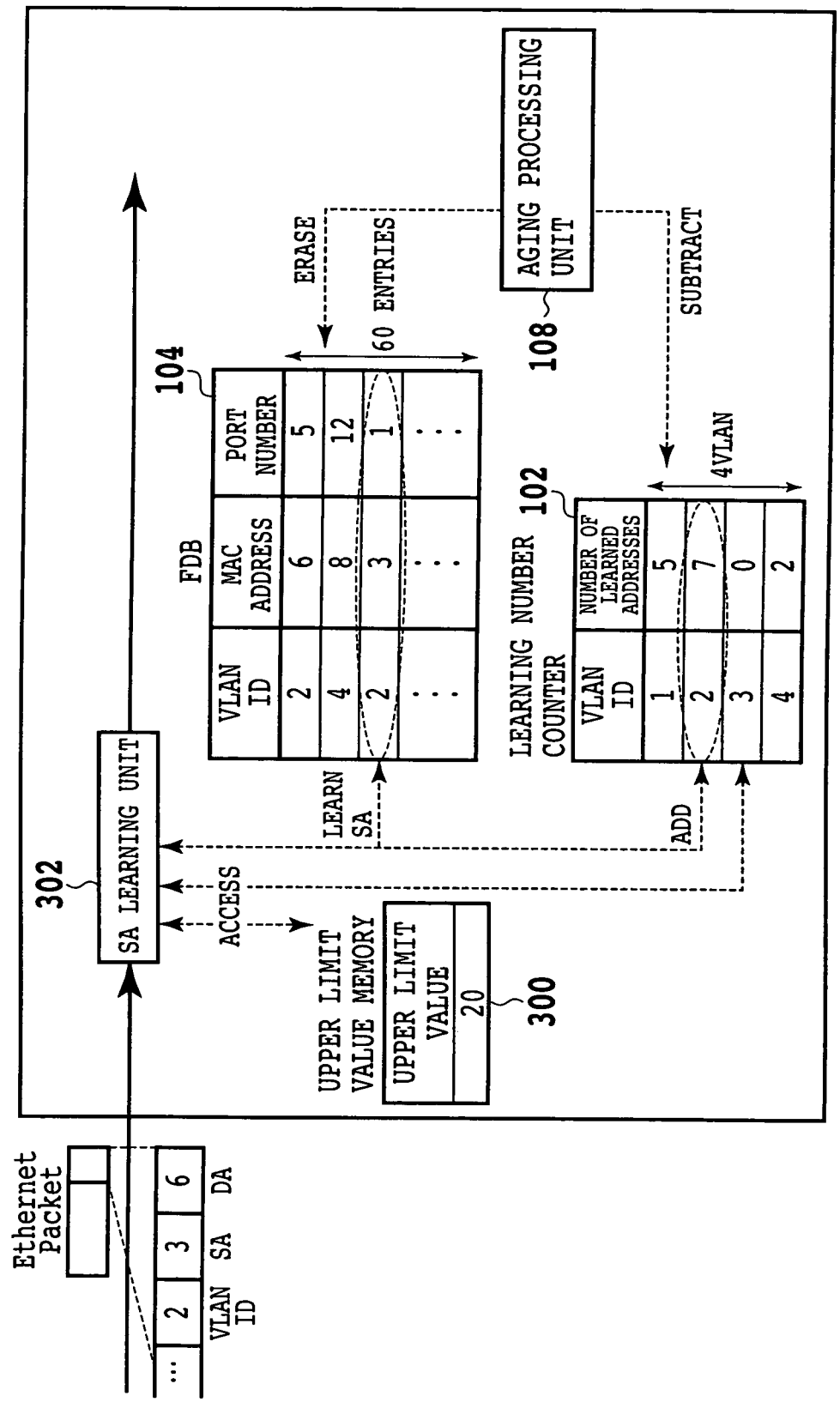

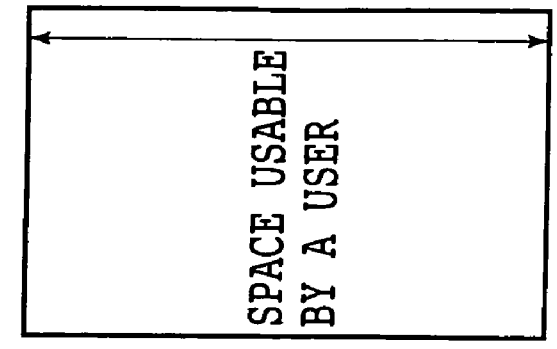
FIG. 11A — SPACE USABLE BY A USER — NUMBER OF ACTIVE USERS = 1
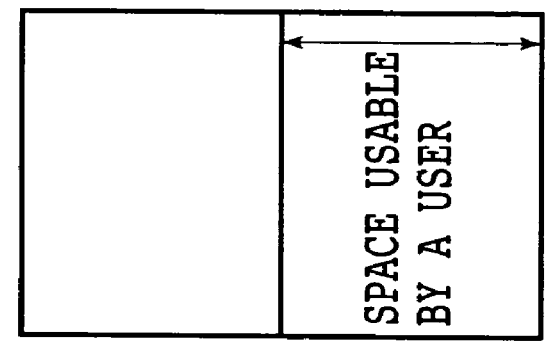
FIG. 11B — SPACE USABLE BY A USER — NUMBER OF ACTIVE USERS = 2
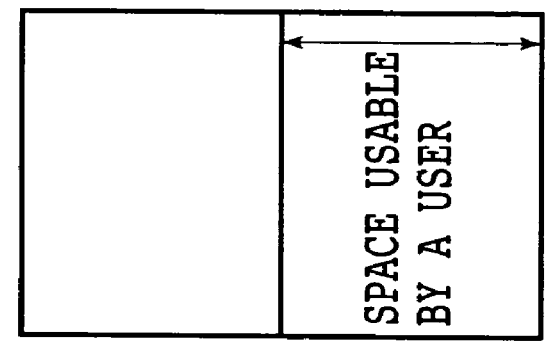
FIG. 11C — SPACE USABLE BY A USER — NUMBER OF ACTIVE USERS = 3
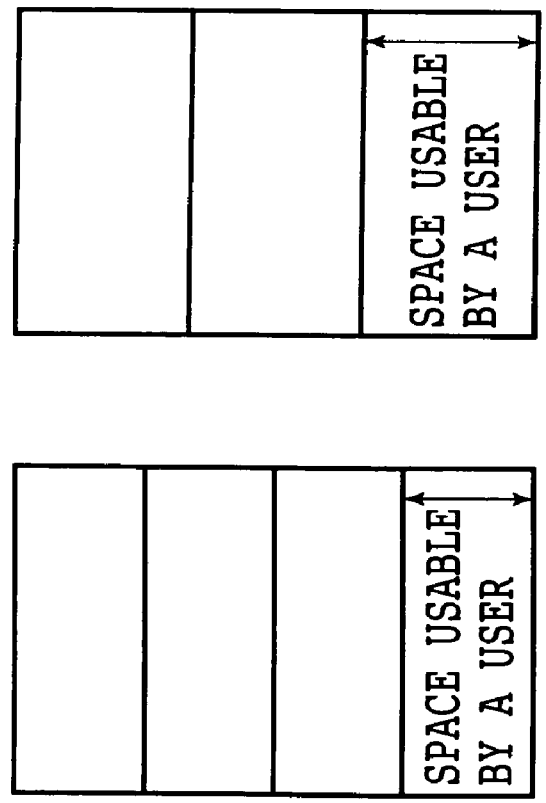
FIG. 11D — SPACE USABLE BY A USER — NUMBER OF ACTIVE USERS = 4

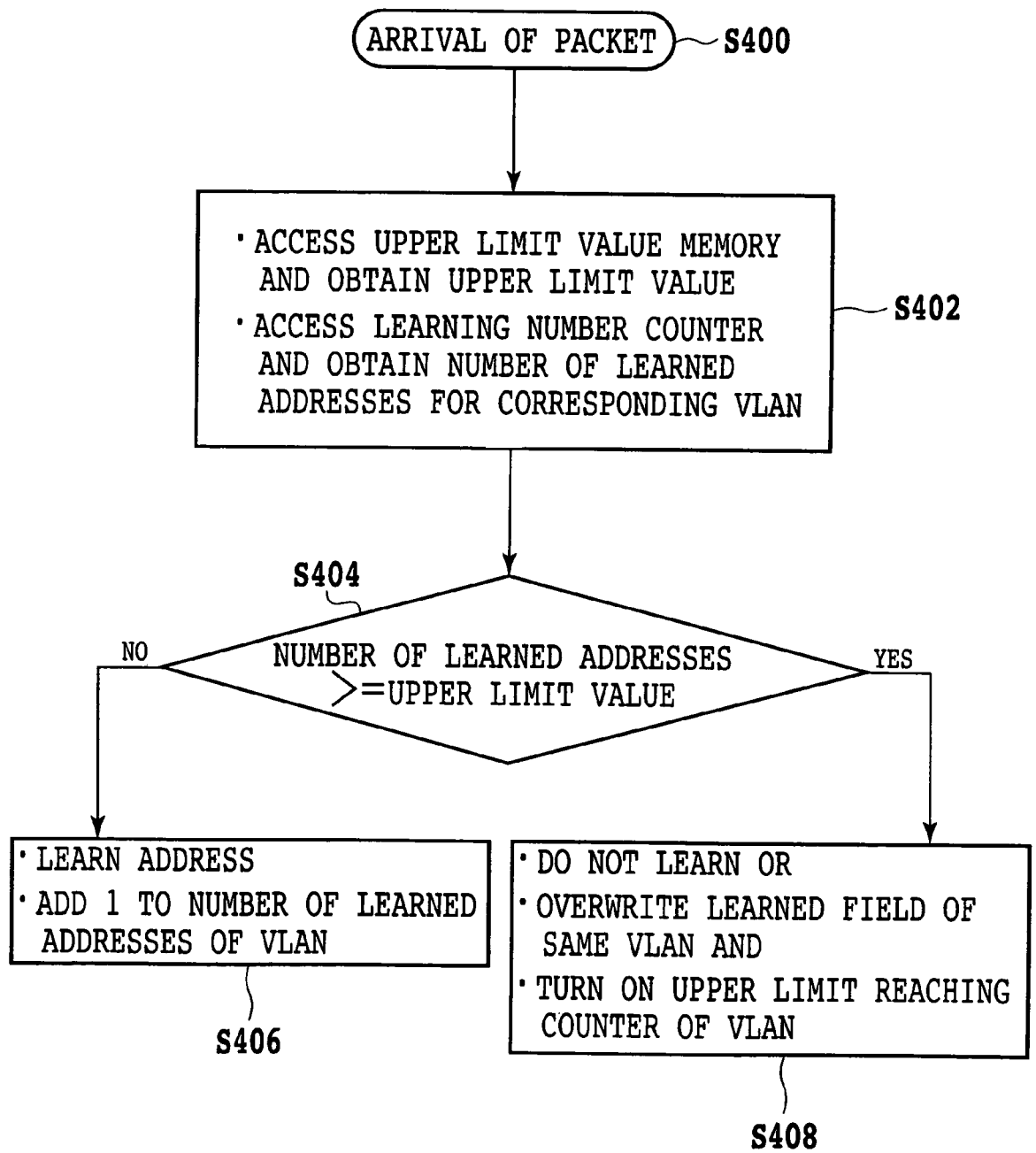

SWITCHING APPARATUS

BACKGROUND OF THE INVENTION

1. Field of the Invention

The present invention relates to a switching apparatus for securing a certain degree of fairness in opportunity to use resources between a plurality of user groups under an environment where the user groups share a communication network.

2. Description of the Related Art

A mode of sharing a network between a plurality of user groups is provided as in a case where a network service provider constructs a packet communication network and provides virtual private network service, for example. The user groups in this example refer to individual subscribers to the network service. In such a packet communication network, a plurality of switching apparatus are installed. Each switching apparatus performs routing according to a destination of a packet, whereby the packet is delivered to a destination terminal. In order to prevent unnecessary packet transmission and suppress increase in traffic, a switching apparatus learns a relation between a port for a received packet and a source address set in the packet in an address learning table. When a destination address of the received packet is learned in the address learning table, the switching apparatus delivers the packet only to a corresponding port. When the destination address of the received packet is not learned in the address learning table, on the other hand, the switching apparatus performs flooding with the packet so as to broadcast the packet to the whole of a virtual network constructed by a user group corresponding to the destination address of the packet. However, the switching apparatus does not distribute the packet to virtual networks of other user groups than the corresponding user group in order to prevent increase in traffic of the other virtual networks due to distribution of the packet and prevent interception of the packet.

Conventional switching apparatus manage only a total number of learned addresses and do not manage a number of learned addresses for each user group. The conventional switching apparatus learn addresses as long as there is a space in the address learning table without discriminating user groups. Patent Literature 1 as a conventional technique discloses a LAN switch controlling a learning table and thereby controlling traffic volume. Patent Literature 1 discloses monitoring of a number of received frames per unit time of a physical port unit and when the number of received frames exceeds a set threshold value, discarding of only a relevant frame by assigning a receiving port of the frame as a destination port of the frame in an address learning table. Further, Patent Literature 2 as a conventional technique discloses an inter-LAN connection apparatus for reducing a load of software processing in routing processing of a CPU. Patent Literature 2 discloses storing of an output port number and a physical address as a next transmission target for each IP address in a simple routing table, reading of an output port number and an IP address as a next transmission target corresponding to a transmitting IP address from the simple routing table, determining of a physical address of the IP address as the next transmission target by a CPU, and setting the physical address in the packet header.

(Patent Literature 1)
 Japanese Patent Laid-open No. Hei 11-341039

(Patent Literature 2)
 Japanese Patent Laid-open No. Hei 7-254912

However, the conventional switching apparatus have the following problems. In an example where a network service provider provides virtual private network service to a plurality of subscribers, especially in a case where the service is provided as commercial service, the network service provider needs to secure certain opportunities to use network resources and a certain level of transfer performance for each of the subscribers. When these switching apparatus forming the packet communication network learn addresses as destination determining means, limitation on opportunities to use an address learning table leads to limitation on opportunities to use the network resources and on the transfer performance.

The conventional switching apparatus do not have a mechanism for controlling an upper limit on a number of learned addresses for each user group and is therefore unable to provide fairness in table use between user groups. This causes a serious problem when table space is exhausted. If a further new address arrives when the table space of the switching apparatus is exhausted, unnecessary copies of the packet (flooding) occur within a virtual network, and consequently degradation in packet performance occurs within a domain where the copies are delivered (broadcast domain) and a part of a network sharing resources for packet delivery performance with the delivery domain. This performance degradation becomes noticeable to a user group to which the new address arriving after the exhaustion of the table belongs. The performance degradation occurs indiscriminately not only to a user group occupying a large space within the table and thus greatly contributing to a table exhausting factor but also to all user groups trying to start new communication after the exhaustion of the table. Furthermore, when an attack is made by a malicious user to exhaust the table (MAC scan attack as one type of Dos attack), effects of degradation in network performance are also produced on other user groups than the user group attacking the network. As a mechanism for preventing such indiscriminate occurrence of performance degradation in a public network, it is an important problem to be solved to provide adequate fairness by identifying user groups and setting a limit to the number of learned addresses in the process of address learning.

Patent Literature 1 limits an amount of frames flowing into a network and only changes a destination port number of a packet received from a receiving port where the number of received frames exceeds a threshold value to a receiving port number in a learning table. The destination address remains stored in the learning table, and an area, which is used for the destination address, of the learning table cannot be used for another destination address. Therefore Patent Literature 1 cannot provide fairness in the learning table and thus cannot solve the above problem.

In Patent Literature 2, a configuration of a routing table is devised to speed up protocol processing. However, Patent Literature 2 does not disclose anything about fairness in a learning table and thus cannot solve the above problem.

SUMMARY OF THE INVENTION

It is accordingly an object of the present invention to provide a switching apparatus that manages a number of learned addresses for each user group and thereby provides adequate fairness.

In accordance with an aspect of the present invention, there is provided a switching apparatus for learning a source address set in a packet in an address learning table and delivering a packet on the basis of an address learned in the address learning table. The switching apparatus includes an address learning unit for limiting a number of learned addresses such that a number of learned addresses for each user group in the address learning table is equal to or less than an address learning upper limit value for the user group.

In accordance with another aspect of the present invention, there is provided a switching apparatus for learning a source address set in a packet in an address learning table and delivering a packet on the basis of an address learned in the address learning table. The switching apparatus includes an address learning unit for limiting a number of learned addresses on the basis of a total number threshold value and an individual guaranteed value set for each user group, so as not to allow increase in a number of learned addresses for a user group which number in the address learning table exceeds the individual guaranteed value when a total number of learned addresses learned in the address learning table reaches the total number threshold value.

In accordance with a further aspect of the present invention, there is provided a switching apparatus for learning a source address set in a packet in an address learning table and delivering a packet on the basis of an address learned in the address learning table. The switching apparatus includes an address learning unit for, on the basis of a total number threshold value and an individual guaranteed value set for each user group, marking an address learned in the address learning table for a user group whose number of learned addresses exceeds the individual guaranteed value at a time of learning the new address, and overwriting the marked address with a new address of a user group whose number of learned addresses is less than the individual guaranteed value when a total number of currently learned addresses reaches a maximum number of addresses learnable in the address learning table.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 9 is a diagram of configuration of an L2SW according to a fourth embodiment of the present invention;
FIG. 10 is a diagram of configuration of an L2SW according to a fifth embodiment of the present invention;
FIG. 11A is a conceptual diagram of use of an FDB;
FIG. 11B is a conceptual diagram of use of the FDB;
FIG. 11C is a conceptual diagram of use of the FDB;
FIG. 11D is a conceptual diagram of use of the FDB;
FIG. 22 is a flowchart of processing of an SA learning unit in FIG. 21.

DETAILED DESCRIPTION OF THE PREFERRED EMBODIMENTS

Figure 1:
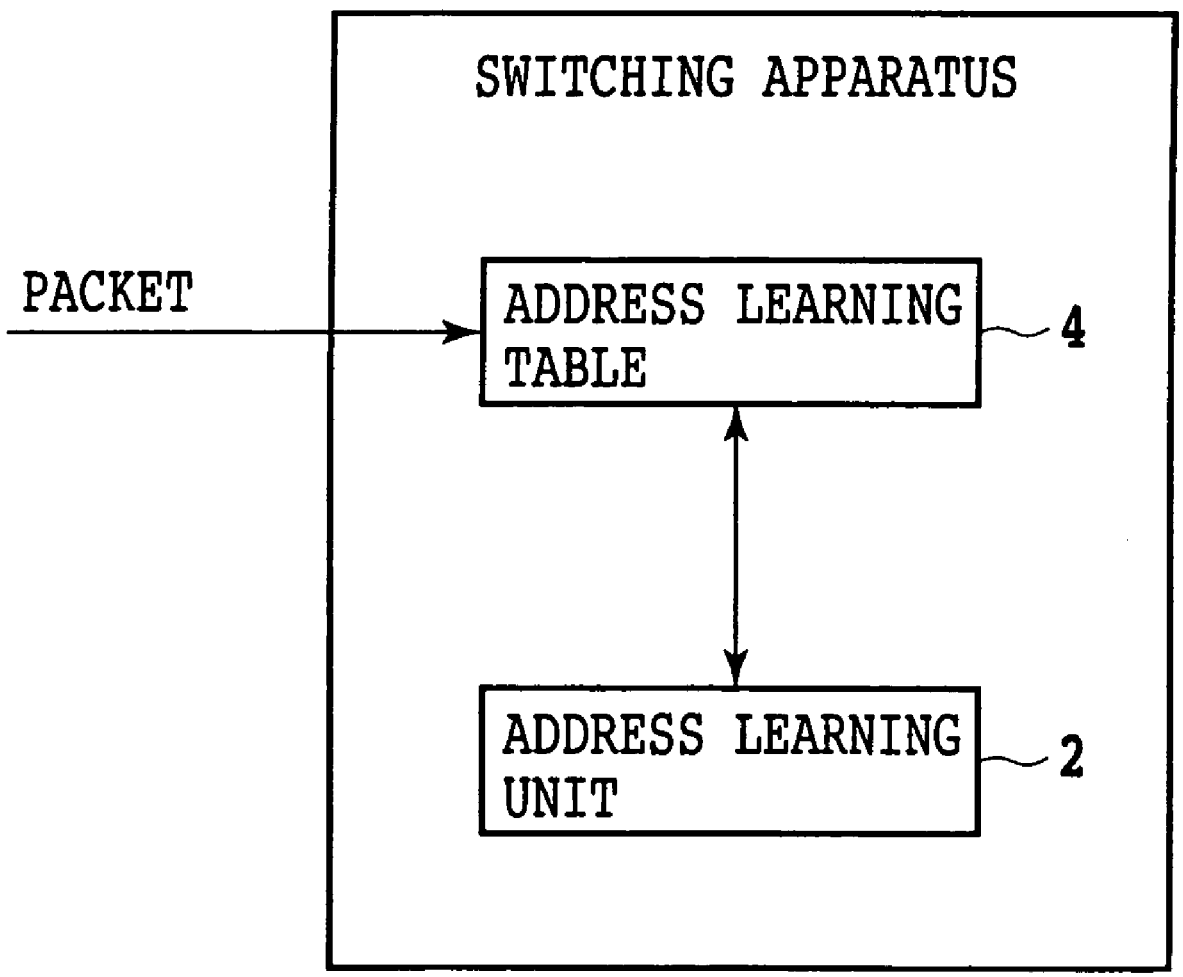
FIG. 1 is a diagram of assistance in explaining principles of the present invention.

Principles of the present invention will be described prior to description of embodiments of the present invention. FIG. 1 is a diagram of assistance in explaining principles of the present invention. As shown in FIG. 1, a switching apparatus has an address learning table 2 and an address learning unit 4. An upper limit value of the number of learned addresses learned in the address learning table 2 for each user group is set as an address learning upper limit value. The address learning unit 4 identifies a user group from a header of a packet arriving at each port. The address learning unit 4 compares the address learning upper limit value for the user group with the number of learned addresses learned in the address learning table 2 for the user group. When the number of learned addresses is less than the address learning upper limit value and the source address is not learned in the address learning table 2, the address is learned in the address learning table 2.

When the number of learned addresses is equal to or more than the address learning upper limit value, the address of the user group is not learned, or another address of the user group is overwritten with the address, for example. Thus, the address is not learned in the address learning table 2 in such a manner as to cause the number of learned addresses to exceed the address learning upper limit value. When a packet arrives, the switching apparatus determines whether a destination address of the packet is learned in the address learning table 2. When the address is learned, the packet is transmitted to a corresponding port. When the address is not learned, a virtual network of a user group of the packet is flooded with the packet. In this case, since learning is not performed in such a manner as to exceed the address learning upper limit value for each user group, it is possible to ensure fairness between user groups regarding use of resources of the address learning table 2.

Figure 2:
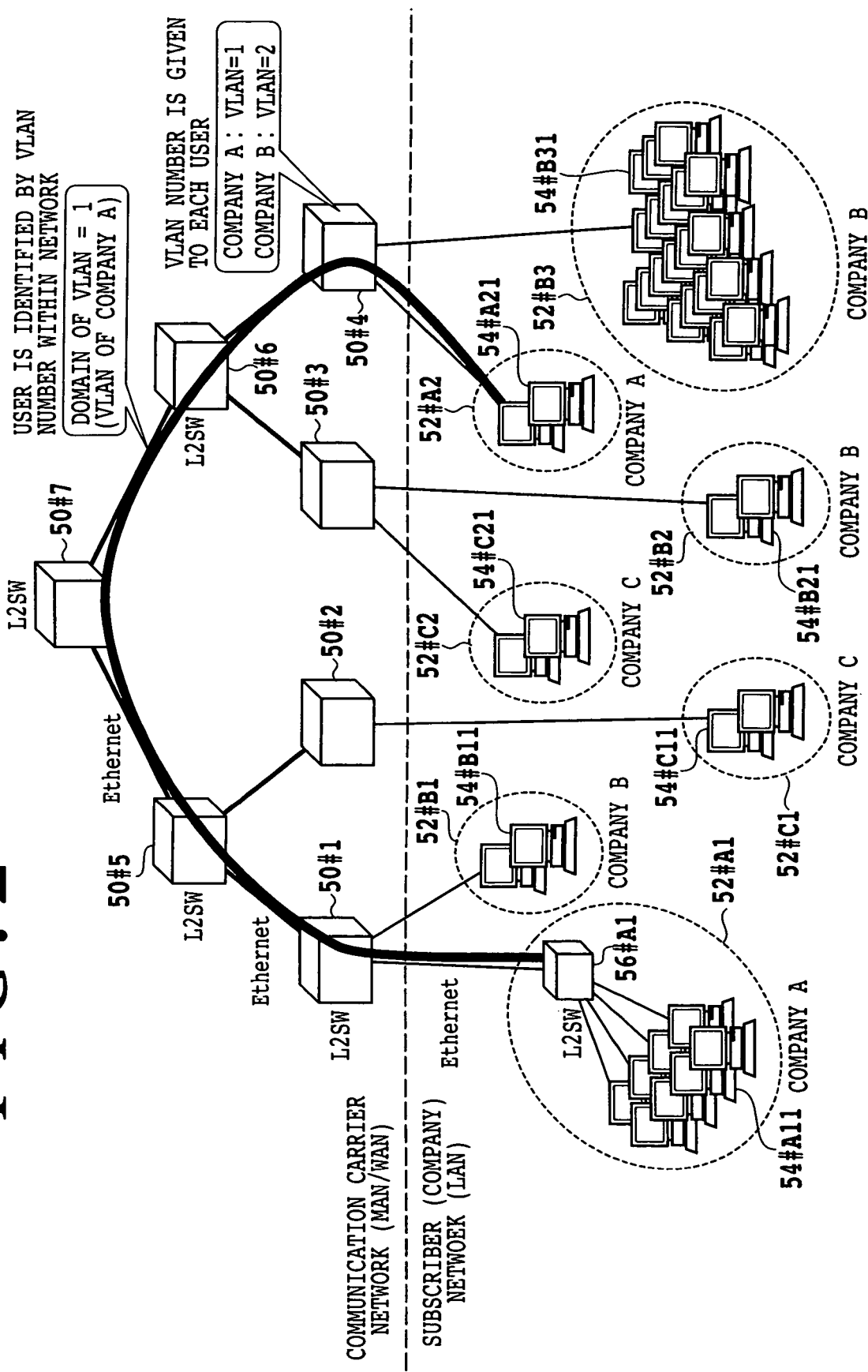
FIG. 2 is a conceptual diagram of configuration of a communication carrier network.

FIG. 2 is a diagram of configuration of a communication carrier network according to an embodiment of the present invention. As shown in FIG. 2, the communication carrier network in this example hierarchically includes only L2SWs 50#$i$ ($i$=1, 2, . . . ) as switching apparatus. Incidentally, the communication carrier network may include a backbone network with ATM switches, SDH apparatus, and the like, in addition to the L2SWs. The L2SWs 50#$i$ ($i$=1 to 4) at the lowest level are connected with company networks (LANs) 52#$i$ ($i$=A1, . . . , C2) of companies A to C. The LANs 52#A1 and 52#A2 are LANs of the company A. The LANs 52#B1 to 52#B3 are LANs of the company B. The LANs 52#C1 and 52#C2 are LANs of the company C. The LANs 52#$i$ ($i$=A1, A2, ..., C2) accommodate a plurality of terminals 54#*ij* (i=A1, ..., C2, j=1, 2, ...) such as personal computers or the like. The LANs 52#*i* (i=A1, ..., C2) may be accommodated directly by L2SWs of the communication carrier or may be accommodated by L2SWs of the communication carrier via L2SWs 56#*i* (i=A1, ...) of the companies A to C or routers not shown in the figure.

The L2SWs 50#*i* and 56#*i* are switching apparatus. In the present embodiment, L2SWs learning layer two-level MAC addresses are assumed. Specifically, the L2SWs have the following functions. (1) As described later, the L2SWs manage addresses for each user or user group. There are various methods conceivable for identifying users or groups. While for example VLAN IDs, input port numbers, a MAC address group grouped and filed in advance, and the like are conceivable, the present embodiment takes as an example a case of identifying a user group by a VLAN number. A source address (SA) to be learned is learned in an address learning table (FDB) while fairness in address learning between user groups is ensured, as will be described later. The learned address is deleted by aging processing when the address is not relearned within a certain time. (2) When a destination address (DA) of a received packet is learned in the FDB, the packet is transmitted to a corresponding port. When the DA address is not learned in the FDB, a virtual network constructed by the VLAN is flooded with the packet. Incidentally, ports to be flooded are set for each VLAN by an operator.

A connection between L2SWs is made by Ethernet. When the companies A to C construct a virtual private network using the communication carrier network, for example a user group is formed by each company, and a VLAN number (VLAN ID), for example, is given to each user group. In FIG. 2, a VLAN ID of the company A is 1, and a VLAN ID of the company B is 2. A thick line in FIG. 2 denotes a domain of the VLAN=1 (the VLAN of the company A). The VLAN ID is set in a packet header.

First Embodiment

Figure 3:
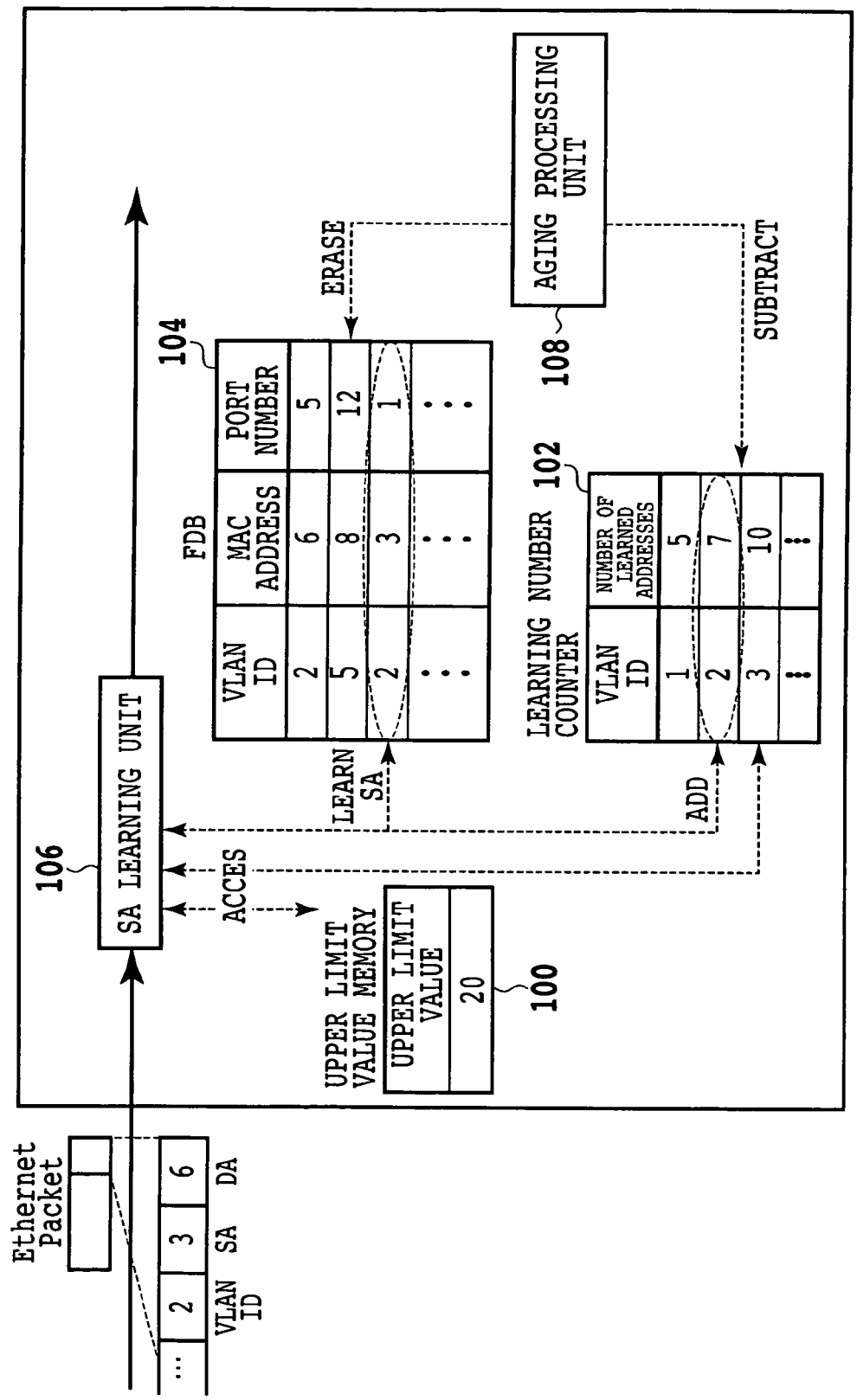
FIG. 3 is a diagram of configuration of an L2SW according to a first embodiment of the present invention.

FIG. 3 is a diagram of configuration related to MAC address learning of an L2SW according to a first embodiment of the present invention. As shown in FIG. 3, an L2SW 50#*i* or 56#*i* includes an upper limit value memory 100, a learning number counter 102, an FDB 104, an SA learning unit 106, and an aging processing unit 108. The upper limit value memory 100 stores a learning upper limit value for each VLAN. An upper limit on the number of addresses learned for each user group is set fixed. The upper limit value may differ for each user group or may be the same. As an example in this case, the same upper limit value of 20 is set for all user groups. The learning number counter 102 is a memory counter for storing the number of learned addresses for each VLAN and includes the number of learned addresses learned in the FDB 104 for each VLAN ID. The FDB 104 is an address learning table for learning addresses and includes, for each address learned, a VLAN ID of a user group to which a terminal having the address belongs, a MAC address of the terminal, and a number of a port receiving a packet transmitted by the terminal.

Figure 4:
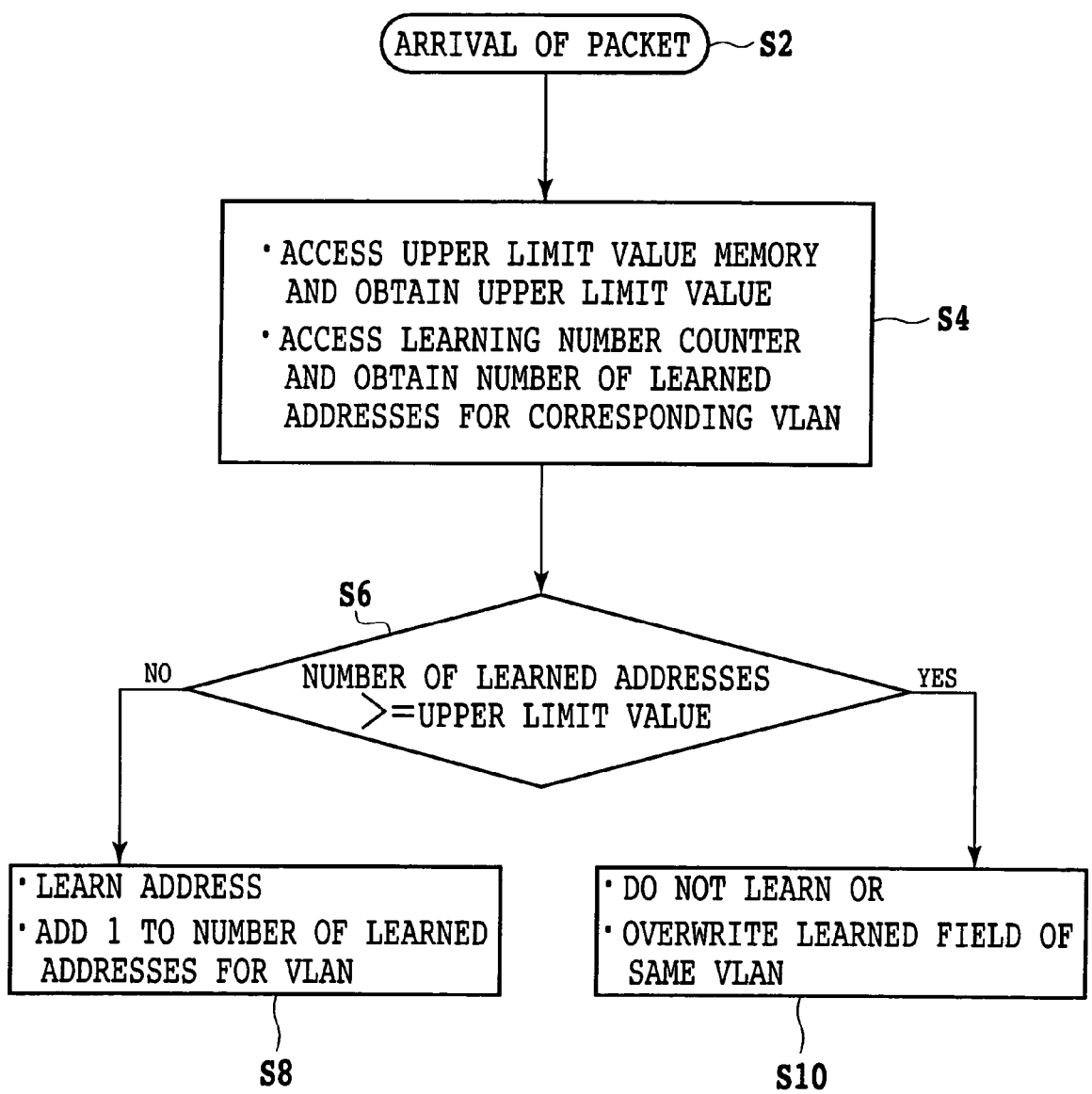
FIG. 4 is a flowchart of processing of an SA learning unit in FIG. 3.

FIG. 4 is a flowchart of the SA learning unit 106. Operation of the SA learning unit 106 will be described in the following with reference to FIG. 4. Suppose that at a step S2, an Ethernet packet, for example a packet of a VLAN ID=2, an SA=3, and a DA=6 arrives from a port. At a step S4, before SA learning, the SA learning unit 106 first accesses the upper limit value memory 100 and the learning number counter 102 to obtain the upper limit value and the number of learned addresses for the VLAN set in the packet. In this case, the SA learning unit 106 obtains the upper limit value=20 and the number of learned addresses for the VLAN ID=7. At a step S6, the SA learning unit 106 compares the number of learned addresses with the upper limit value. When the number of learned addresses is less than the upper limit value, the SA learning unit 106 proceeds to a step S8. When the number of learned addresses is equal to or more than the upper limit value, the SA learning unit 106 proceeds to a step S10.

At the step S8, the SA learning unit 106 (i) learns the VLAN ID, the SA address, and the receiving port number of the packet in the FDB 104 and (ii) adds 1 to the number of learned addresses corresponding to the VLAN ID in the learning number counter 102. In this case, since the number of learned addresses is 7 and is less than the upper limit value, the SA learning unit 106 learns the VLAN ID=2, the MAC address=3, and the packet receiving port number=1 in the FDB 104 and adds 1 to the number of learned addresses for the VLAN ID=2 in the learning number counter 102.

At the step S10, the SA learning unit 106 (i) does not learn the new SA or (ii) overwrites a learned address of the same VLAN ID with the new address. At this time, the SA learning unit 106 does not make an addition to or a subtraction from the number of learned addresses for the VLAN ID in the learning number counter 102. Thus, the number of learned addresses for each user group does not exceed the upper limit number set for the group.

When no update is performed within a certain time with respect to an address learned in the FDB 104 (no packet having the address as SA is received), the aging processing unit 108 erases the address from the FDB 104 and subtracts 1 from the number of learned addresses for the VLAN ID of the address in the learning number counter 102. When a packet arrives, the switching apparatus determines whether a DA of the packet is learned in the FDB 104. When the DA of the packet is learned, the packet is transmitted to a corresponding port. When the DA of the packet is not learned, a virtual network with the VLAN ID of the packet is flooded with the packet.

As described above, even when a user group is to use such a large number of addresses as to be unallowable in terms of fair use of the FDB in the switching apparatus, the present embodiment can effect control to prevent the number of learned addresses for the user group in the FDB from exceeding the learning upper limit value. Therefore, a table space to be used by other user groups is not unlimitedly squeezed.

Second Embodiment

Figure 5:
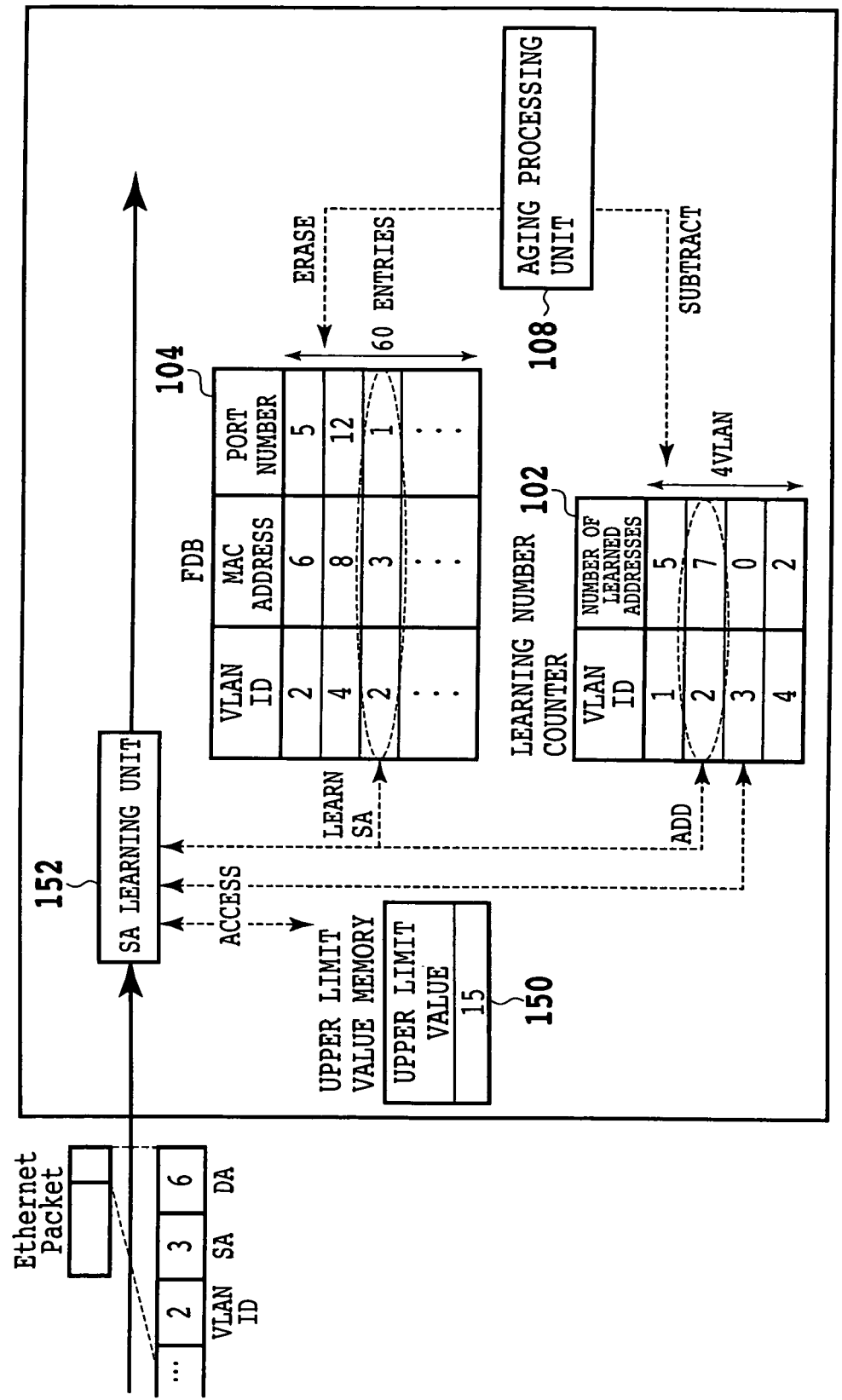
FIG. 5 is a diagram of configuration of an L2SW according to a second embodiment of the present invention.
Figure 6:
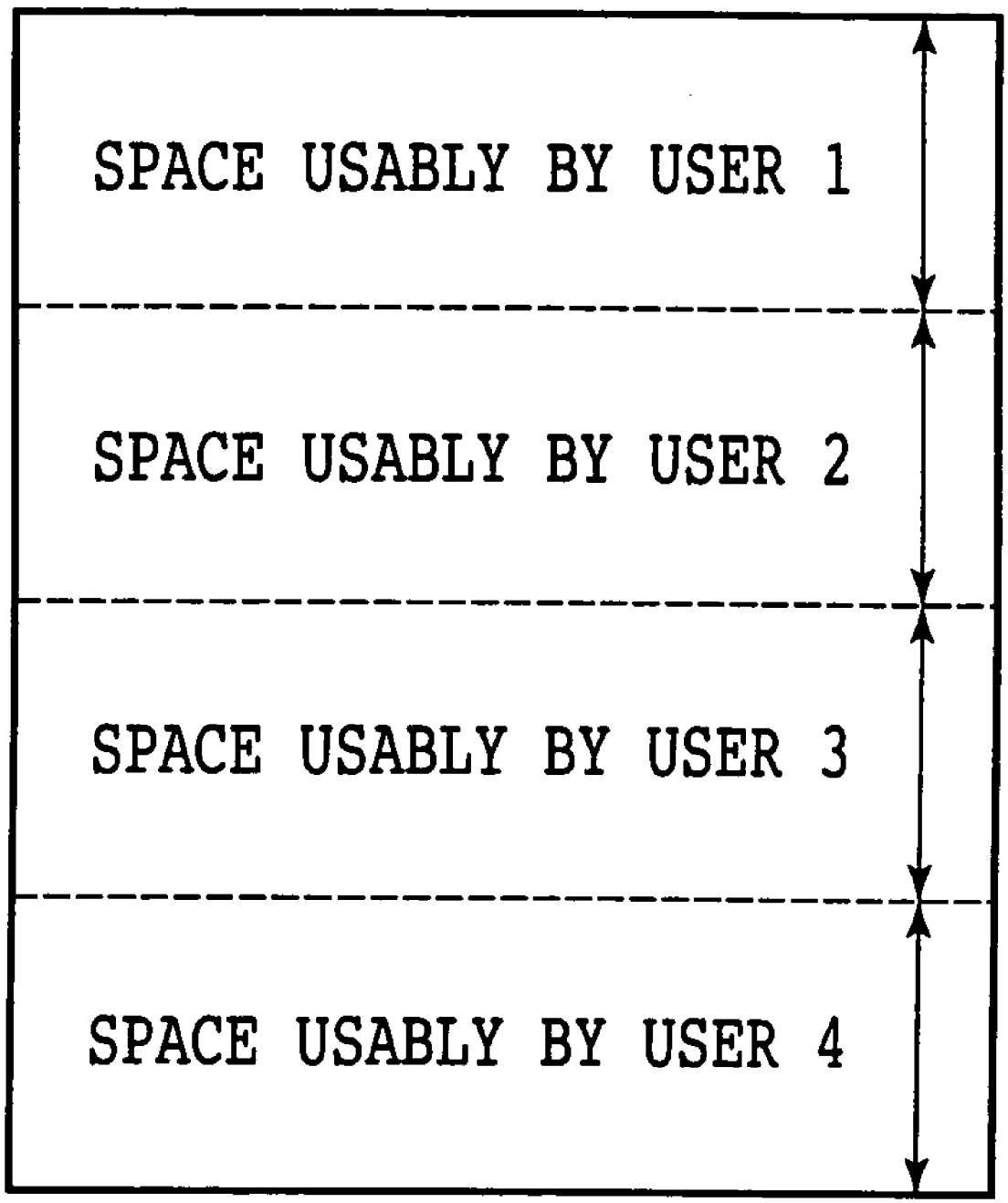
FIG. 6 is a conceptual diagram of use of an FDB.

FIG. 5 is a diagram of configuration related to MAC address learning of an L2SW according to a second embodiment of the present invention. Substantially the same components as the components in FIG. 3 are identified by the same reference numerals. In the second embodiment, a method of setting an upper limit value in an upper limit value memory 150 is different from the setting method of the first embodiment. In the first embodiment, a certain fixed value is assigned as an upper limit value. In the second embodiment, on the other hand, the upper limit value is assigned according to a capacity of an FDB 104 and the number of user groups. Specifically, a value obtained by dividing the number of FDB entries by a total number of VLANs is assigned as a learning upper limit value for each VLAN. For example, when the number of FDB entries is 60 and the total number of VLANs is 4, 60/4=15 is set in the upper limit value memory 150. FIG. 6 is a conceptual diagram of use of the FDB 104. As shown in FIG. 6, when the total number of VLANs is 4, each user i (i=1 to 4) can use a part of the FDB 104 as a usable area. The part corresponds to the number obtained by dividing the number of FDB entries by the total number of VLANs. As described above, in addition to similar effects to those of the first embodiment, since the upper limit value is set according to the FDB capacity and the number of users, the second embodiment guarantees the number of learned addresses up to the upper limit value to each user and thus enables the FDB to be used more fairly between user groups.

Third Embodiment

Figure 7:
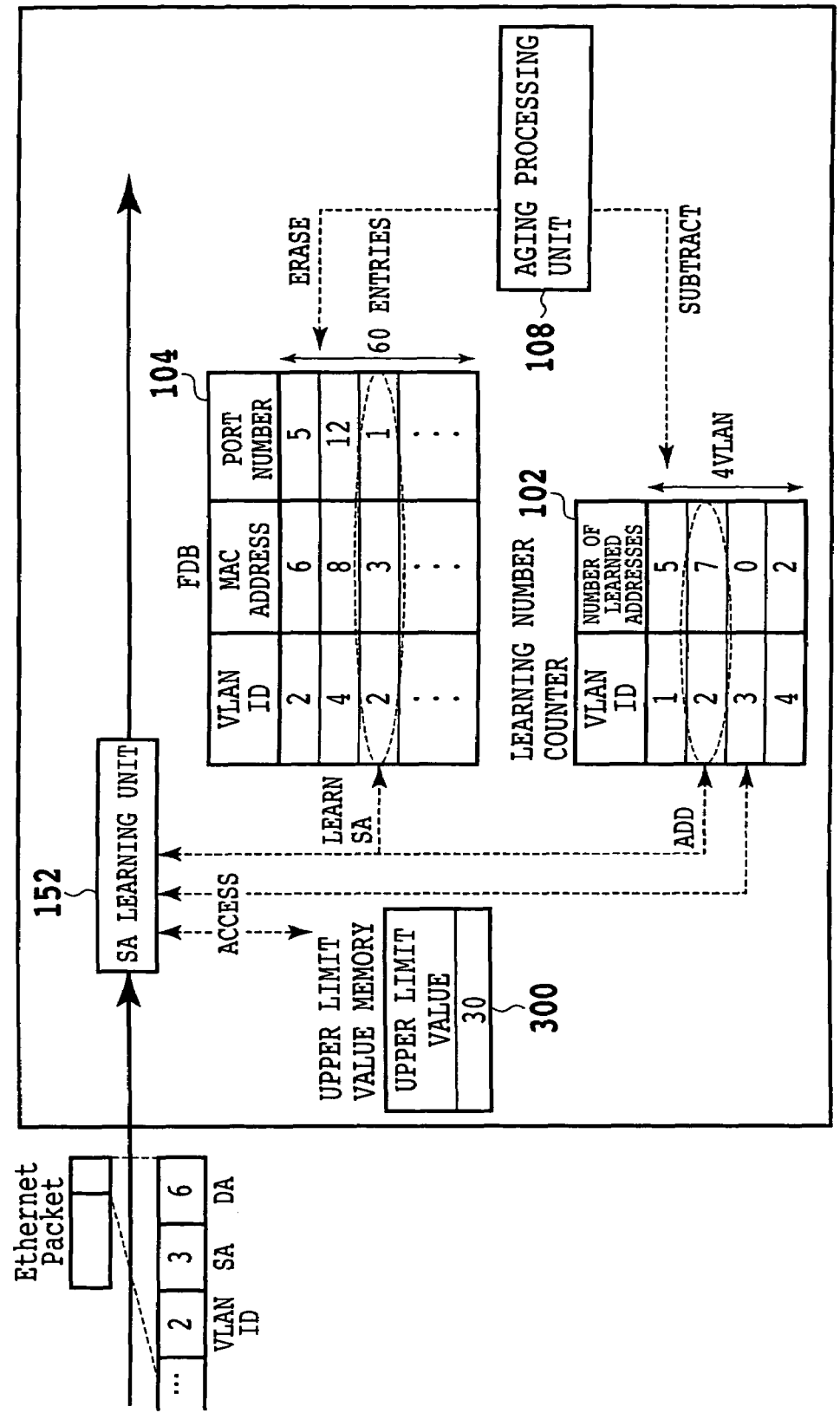
FIG. 7 is a diagram of configuration of an L2SW according to a third embodiment of the present invention.
Figure 8:
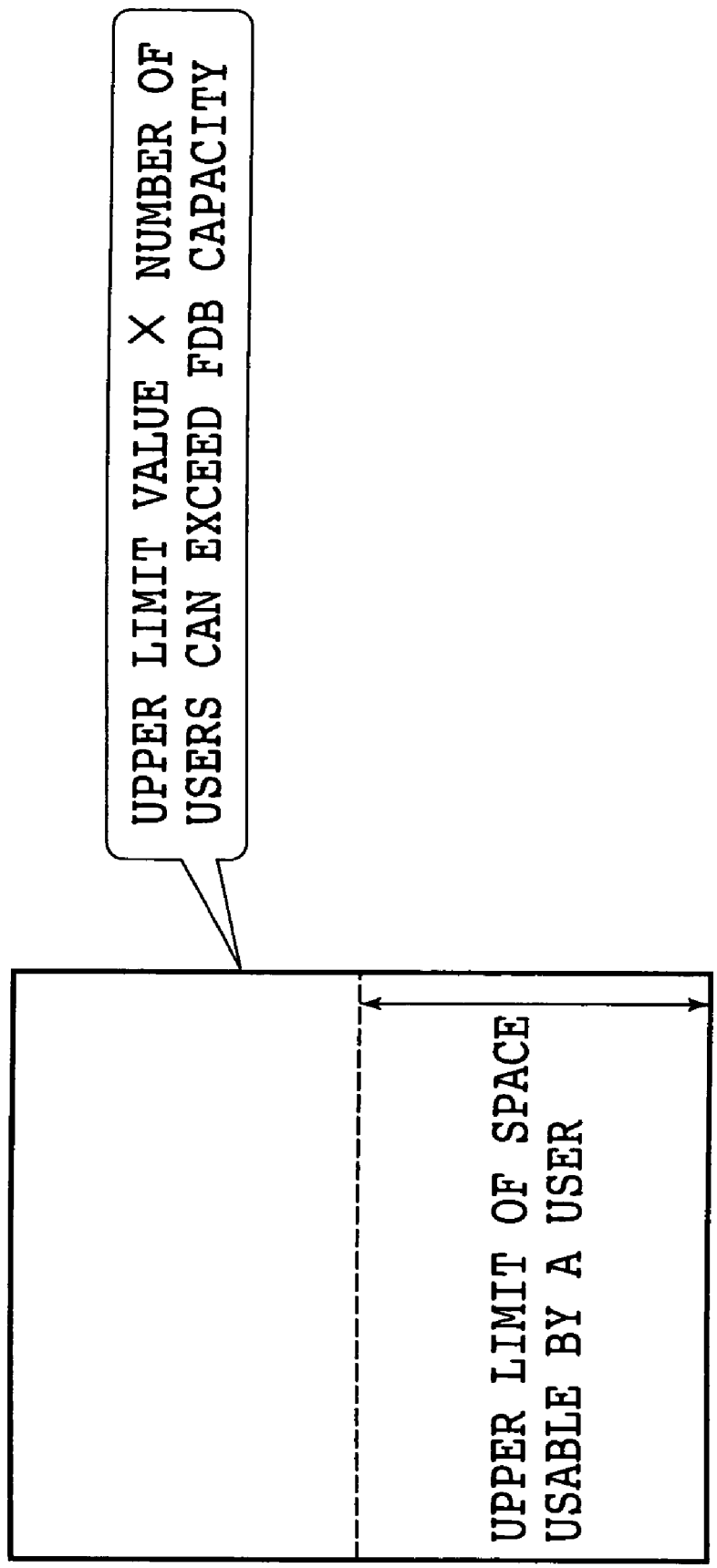
FIG. 8 is a conceptual diagram of use of an FDB.

FIG. 7 is a diagram of configuration related to MAC address learning of an L2SW according to a third embodiment of the present invention. Substantially the same components as the components in FIG. 3 are identified by the same reference numerals. In the third embodiment, a method of setting an upper limit value in an upper limit value memory 200 is different from the setting methods of the first and second embodiments. In the third embodiment, a fixed value exceeding a value for allocating a total number of entries of an FDB 104 to all user groups equally is set as an address learning upper limit value in the upper limit value memory 200. For example, when the total number of entries of the FDB 104 is 60 and a total number of VLANs is 4, 30, which exceeds 15 as a value for allocating the total number of entries of the FDB 104 to all the user groups equally, is set as the address learning upper limit value, for example, as shown in FIG. 7. This is because in the second embodiment setting a value for allocating the total number of entries of the FDB 104 to all the user groups equally as the upper limit value, perfect fairness can be provided to all the user groups in terms of the number of learned addresses, whereas in cases where the required number of learned addresses differs for different user groups, a table space not used by a user group cannot be used by another user group even if a total space of the table is not fully used. Therefore the second embodiment cannot make effective use of the table when required table space differs greatly between user groups. Accordingly, the third embodiment sets a fixed value exceeding a value for allocating the total number of entries of the FDB 104 to all the user groups equally as the address learning upper limit value in the upper limit value memory 200. FIG. 8 is a conceptual diagram of use of the FDB 104. A sum of individual learning upper limit values exceeds the total capacity of the table. For example, as shown in FIG. 8, when all the user groups have the same upper limit value, the upper limit value×the number of users exceeds the total number of entries of the FDB 104.

According to the embodiment described above, since the sum of individual learning upper limit numbers exceeds the total number of entries of the FDB, the FDB table may be exhausted to cause indiscriminate degradation in performance when there are many user groups requiring a large FDB table space. However, when a small number of user groups have a table space requirement exceeding the learning upper limit and a sum of learning upper limit values of the small number of user groups is set smaller than the total number of entries, the FDB is not exhausted, and therefore significant degradation in performance is contained within only a region of the small number of user groups using a large portion of the table. The third embodiment is effective especially against a malicious attack attempting to exhaust the FDB, because it is considered not likely that a large number of user groups will simultaneously make such a malicious attack.

Fourth Embodiment

FIG. 9 is a diagram of configuration related to MAC address learning of an L2SW according to a fourth embodiment of the present invention. Substantially the same components as the components in FIG. 3 are identified by the same reference numerals. In the fourth embodiment, a method of setting an upper limit value in an upper limit value memory 250 is different from the setting methods of the first to third embodiments. The first to third embodiments use equal allocation methods as methods for determining address learning upper limits to be set fixedly. When conditions of subscriptions of user groups are different, however, equal allocation cannot necessarily be said to be fair. Accordingly, when subscription conditions are different, the fourth embodiment allows each individual user group to have a different address learning upper limit number and sets a fairer value on the basis of subscription managing information. As a method of determining an address learning upper limit number according to subscription conditions, a subscription band is selected as subscription managing information, and setting is made such that a user group having a wider subscription band is given a larger table space. Supposing for example that VLAN 1=10 Mb/s, VLAN 2=20 Mb/s, VLAN 3=40 Mb/s, and VLAN 4=50 Mb/s, a total number of entries of an FDB 104 is divided in proportion to the subscription bands, as shown in FIG. 9, whereby 5, 10, 20, and 25 are set in the upper limit value memory 250 as upper limit values of the VLANs=1, 2, 3, and 4.

As another method of determining an address learning upper limit number according to subscription conditions, a number of subscribing locations is selected, and setting is made such that a user group having a larger number of subscribing locations as delivery destinations is given a larger table space. For example, the companies A, B, and C shown in FIG. 2 have two locations, three locations, and two locations, respectively, and therefore the company B having the largest number of locations is given a largest table space.

As described above, in addition to similar effects to those of the first embodiment, since the address learning upper limit number is set according to the subscription conditions, the fourth embodiment allows each user group to use the table up to a reasonable upper limit value according to the subscription conditions.

Fifth Embodiment

FIG. 10 is a diagram of configuration related to MAC address learning of an L2SW according to a fifth embodiment of the present invention. Substantially the same components as the components in FIG. 3 are identified by the same reference numerals. In the fifth embodiment, a method of setting an upper limit value in an upper limit value memory 300 is different from the setting methods of the first to fourth embodiments. In the first to fourth embodiments, upper limit values are set fixedly. However, a user group does not use an FDB until communication is started. It is therefore not effective from a viewpoint of use of the FDB to secure the FDB for user groups in advance before communication is started. Accordingly, in the fifth embodiment, a value for equally allocating a total number of entries of the FDB 104 to user groups currently learned in the FDB 104 is calculated dynamically and set as an address learning upper limit value in the upper limit value memory 300. When the total number of entries of the FDB 104 is 60 and the number of currently learned VLANs is 2, for example, 30 as a value obtained by equally dividing the total number of entries of the FDB 104 by the number of currently learned VLANs is the address learning upper limit value at the present time. FIGS. 11A to 11D are conceptual diagrams of use of the FDB 104. When the number of active user groups is 1 as shown in FIG. 11A, a total entry area of the FDB 104 can be used by the user group. When the number of active user groups is 2 as shown in FIG. 11B, ½ of all the entries of the FDB 104 can be used by each of the active user groups. When the number of active user groups is 3 as shown in FIG. 11C, ⅓ of all the entries of the FDB 104 can be used by each of the active user groups. When the number of active user groups is 4 as shown in FIG. 11D, ¼ of all the entries of the FDB 104 can be used by each of the active user groups.

An SA learning unit 302 writes a result of division of a capacity of the FDB 104 by the number of user groups learned in the FDB 104 as an upper limit value to the upper limit value memory 300. Processing of the SA learning unit 302 when a packet arrives is similar to the processing of FIG. 4. However, at the step S8 in FIG. 4, when there is a blank entry in the FDB 104, the address is learned in the blank entry; when there is no blank entry, a learned field of the VLAN whose addresses exceed the upper limit value is overwritten.

As described above, in addition to similar effects to those of the first embodiment, the fifth embodiment can make more efficient use of the FDB.

Sixth Embodiment

Figure 12:
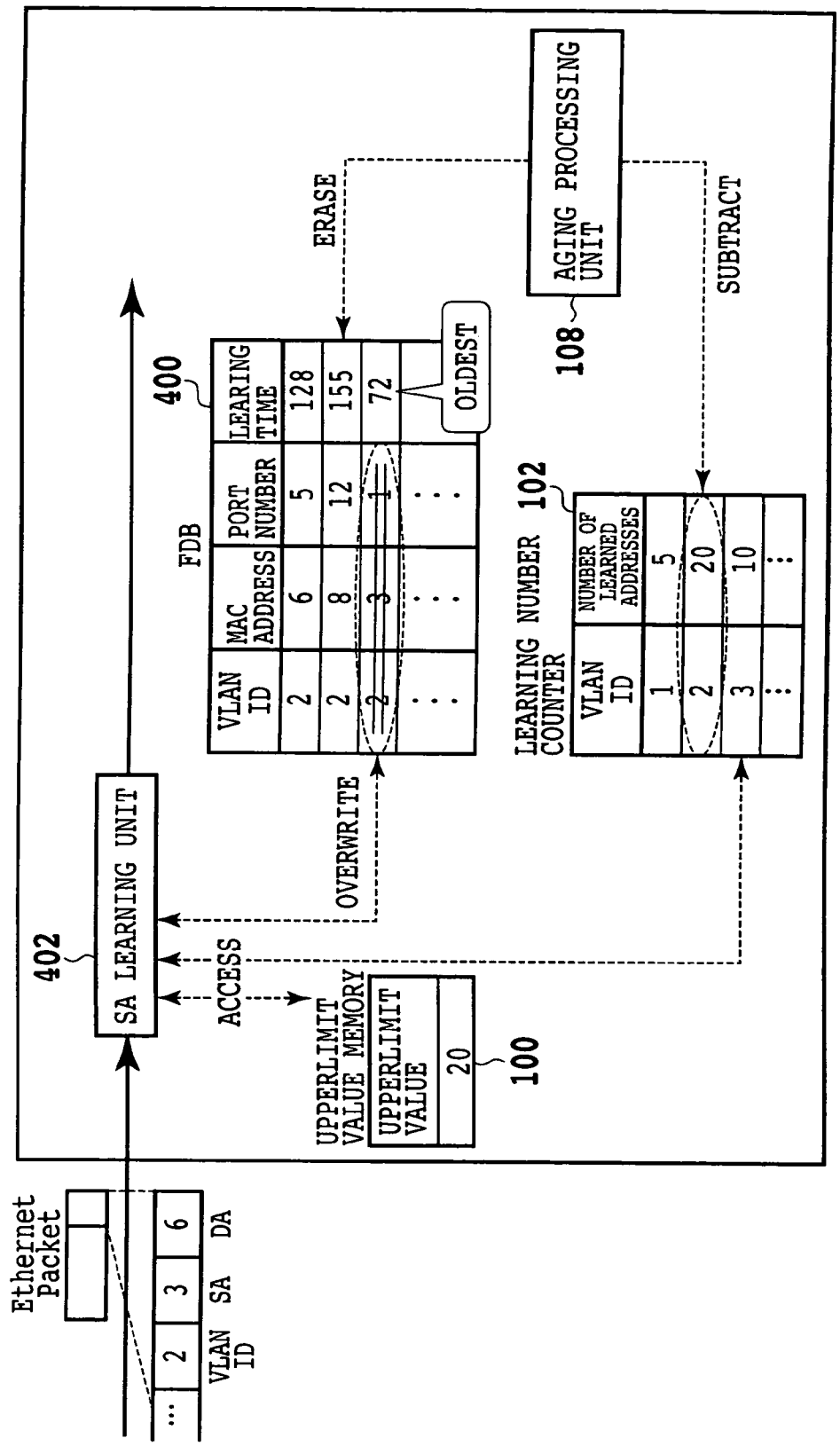
FIG. 12 is a diagram of configuration of an L2SW according to a sixth embodiment of the present invention.

FIG. 12 is a diagram of configuration related to MAC address learning of an L2SW according to a sixth embodiment of the present invention. Substantially the same components as the components in FIG. 3 are identified by the same reference numerals. In the sixth embodiment, a column for setting a learning time is added to an FDB 400. The learning time represents a last time the address is learned. For example, the value is reset in each cycle of aging erasure and is incremented each time the address is updated within an aging cycle. The address is updated when a packet having the address as SA arrives and the address is relearned in the FDB 400. Thus, a smallest value of learning time indicates an oldest time of latest learning of the address. Incidentally, when the learning time remains reset and is not incremented within a cycle of aging erasure, the address is erased by an aging processing unit 108. Processing of an SA learning unit 402, when the number of addresses learned in a learning number counter for the VLAN of the arrived packet is not less than an upper limit value, is different from that of the SA learning unit 106 in FIG. 3. Otherwise, the SA learning unit 402 is similar to the SA learning unit 106. When the number of learned addresses for the VLAN of the arrived packet is not less than the upper limit value, the SA learning unit 402 overwrites an address with the oldest learning time of 72 for the VLAN learned in the FDB 400 as shown in FIG. 12 with the SA and sets the learning time to 1.

As described above, in addition to similar effects to those of the first embodiment, since the oldest address is overwritten, the sixth embodiment can more efficiently obtain an effect of flooding prevention by address learning for the same VLAN.

Seventh Embodiment

Figure 13:
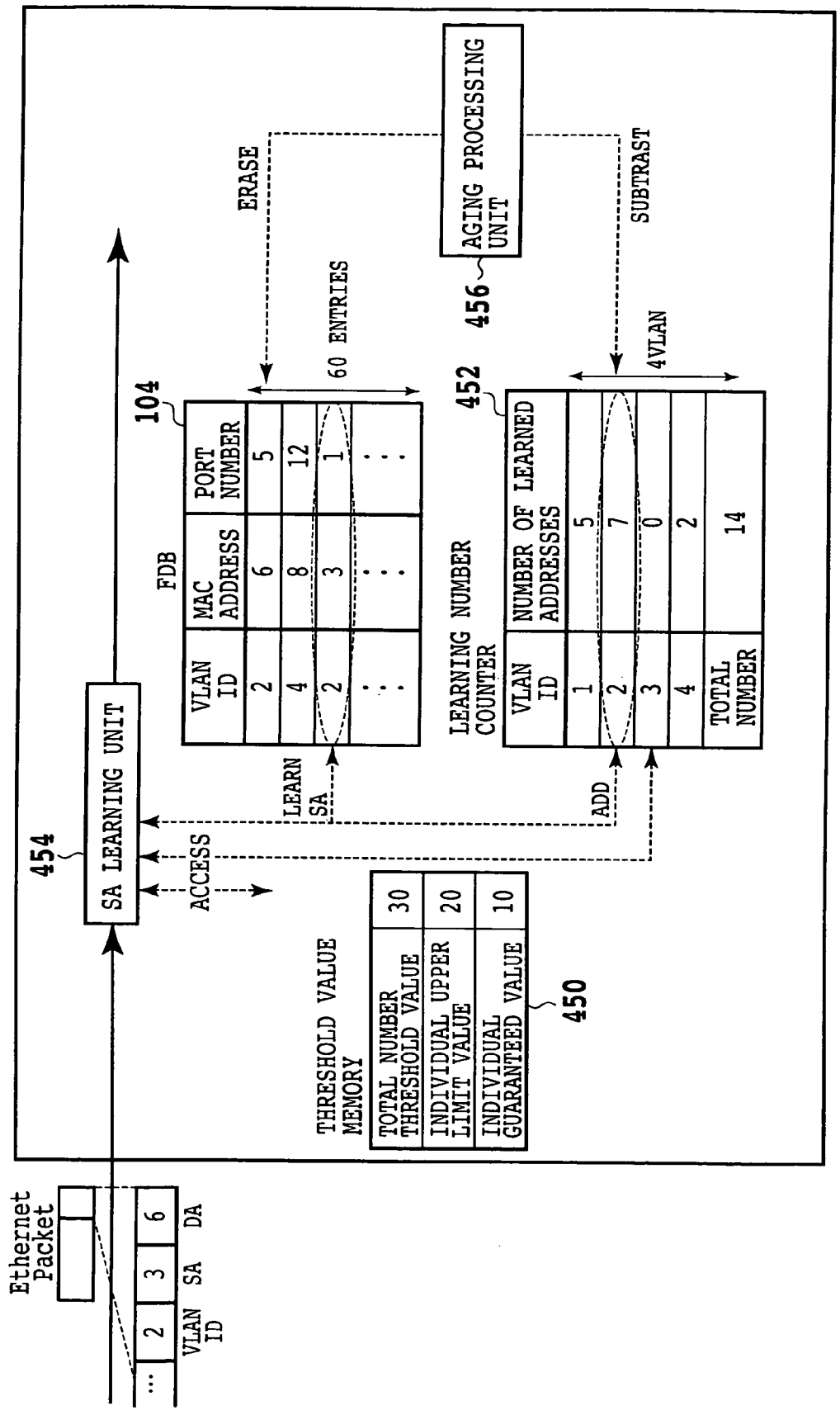
FIG. 13 is a diagram of configuration of an L2SW according to a seventh embodiment of the present invention.

FIG. 13 is a diagram of configuration related to MAC address learning of an L2SW according to a seventh embodiment of the present invention. Substantially the same components as the components in FIG. 3 are identified by the same reference numerals. When an address learning requirement greatly differs between user groups and the difference cannot be predicted in advance at a time of sign-up, it is difficult to simply set an address learning upper limit value for each user group and determine such a setting value as to eliminate possibility of address exhaustion. Accordingly, the seventh embodiment sets a minimum guaranteed number for an amount of use of an FDB 104 by each user group and allows its total amount to be occupied by each of user groups set in advance as a reservation number. A remaining unreserved area is shared by all user groups. By making setting such that a number obtained by adding together a sum of reserved table spaces and a table space shared by all the user groups does not exceed a total table capacity, a minimum space of the FDB 104 is secured for each user group.

A total number threshold value, an individual upper limit value, and an individual guaranteed value are set in a threshold value memory 450. The individual guaranteed value represents a minimum amount of use of the FDB 104 guaranteed to each user group and its total amount for the user groups can be occupied by each of the user groups set in advance as a reservation number. The individual guaranteed value may be set for each user group or may be common to all the user groups. The total number threshold value is a sum of a general threshold value and a minimum individual guaranteed value for a user group. The general threshold value represents the table space shared by all the user groups and is equal to or less than (the capacity of the FDB 104−a sum of individual guaranteed values for all the user groups).

Figure 14:
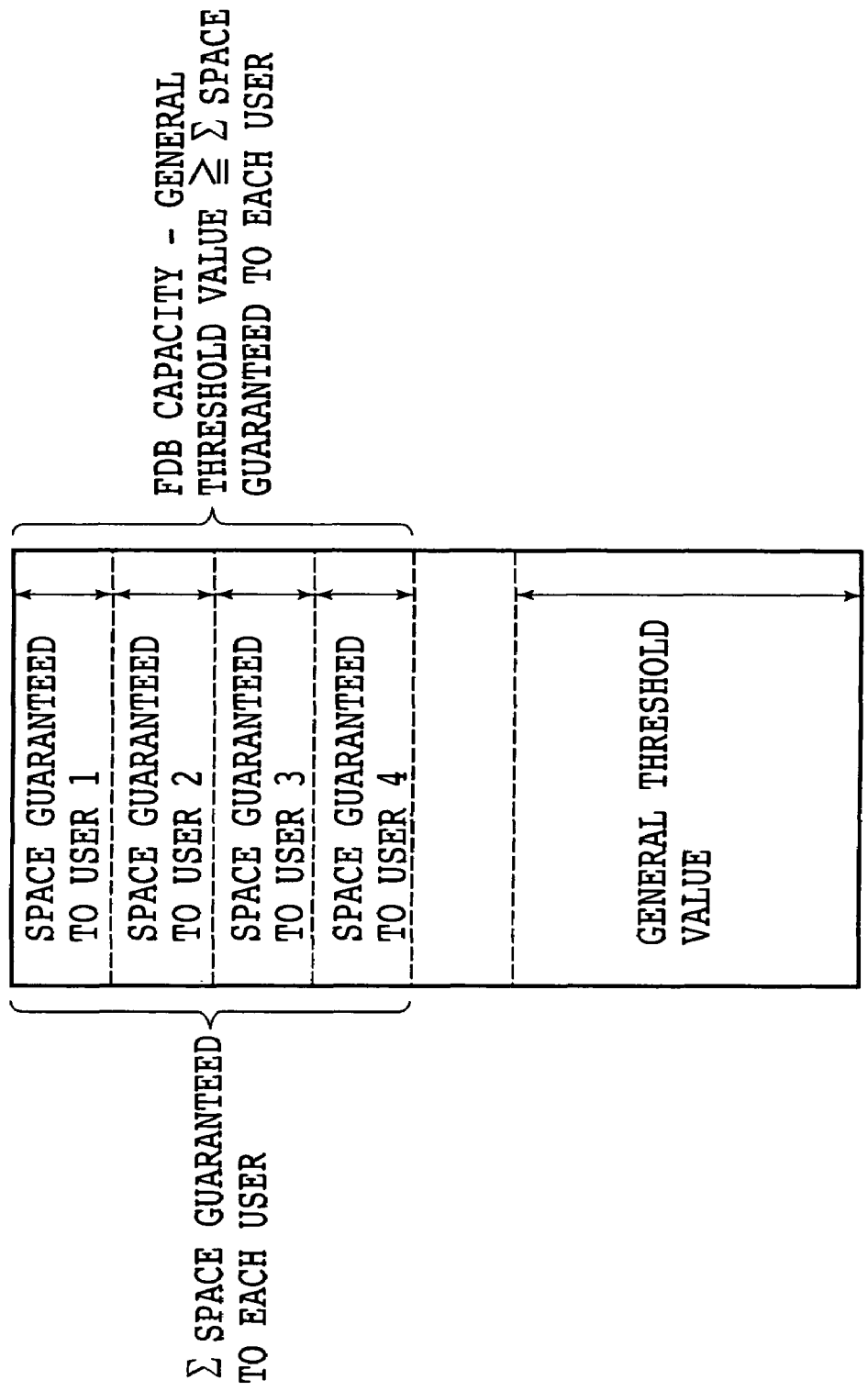
FIG. 14 is a conceptual diagram of use of an FDB.

FIG. 14 is a conceptual diagram of use of the FDB 104. As shown in FIG. 14, the general threshold value and the sum of the individual guaranteed values of the user groups ($\Sigma$ the individual guaranteed value of each user) are set so as not to exceed the capacity of the FDB 104. That is, the capacity of the FDB 104−the general threshold value$\geq \Sigma$ the individual guaranteed value of each user. A user group whose use of the FDB 104 exceeds the individual guaranteed value uses the FDB 104 within the general threshold value. The number of user groups is 4, the capacity of the FDB 104=60, the individual guaranteed value=10 (common to all the user groups), the general threshold value$\leq$60−10×4=20, and the total number threshold value$\leq$30 (20+10). For example, as shown in FIG. 13, the total number threshold value=30 (the general threshold value=20). The individual upper limit value for each user group is an upper limit value of the number of learned addresses for the user group. The individual guaranteed value$\leq$the individual upper limit value$\leq$(the individual guaranteed value+the general threshold value). The individual upper limit value is intended to set an upper limit to use by one user group of the shared table indicated by the general threshold value. In a case where the individual guaranteed values of user groups differ, supposing that the individual guaranteed value of a user group A=10, the individual guaranteed value of a user group B=15, and the capacity of the FDB 104=30, the total number threshold value$\leq$30−(10+5)+5=20.

Figure 15:
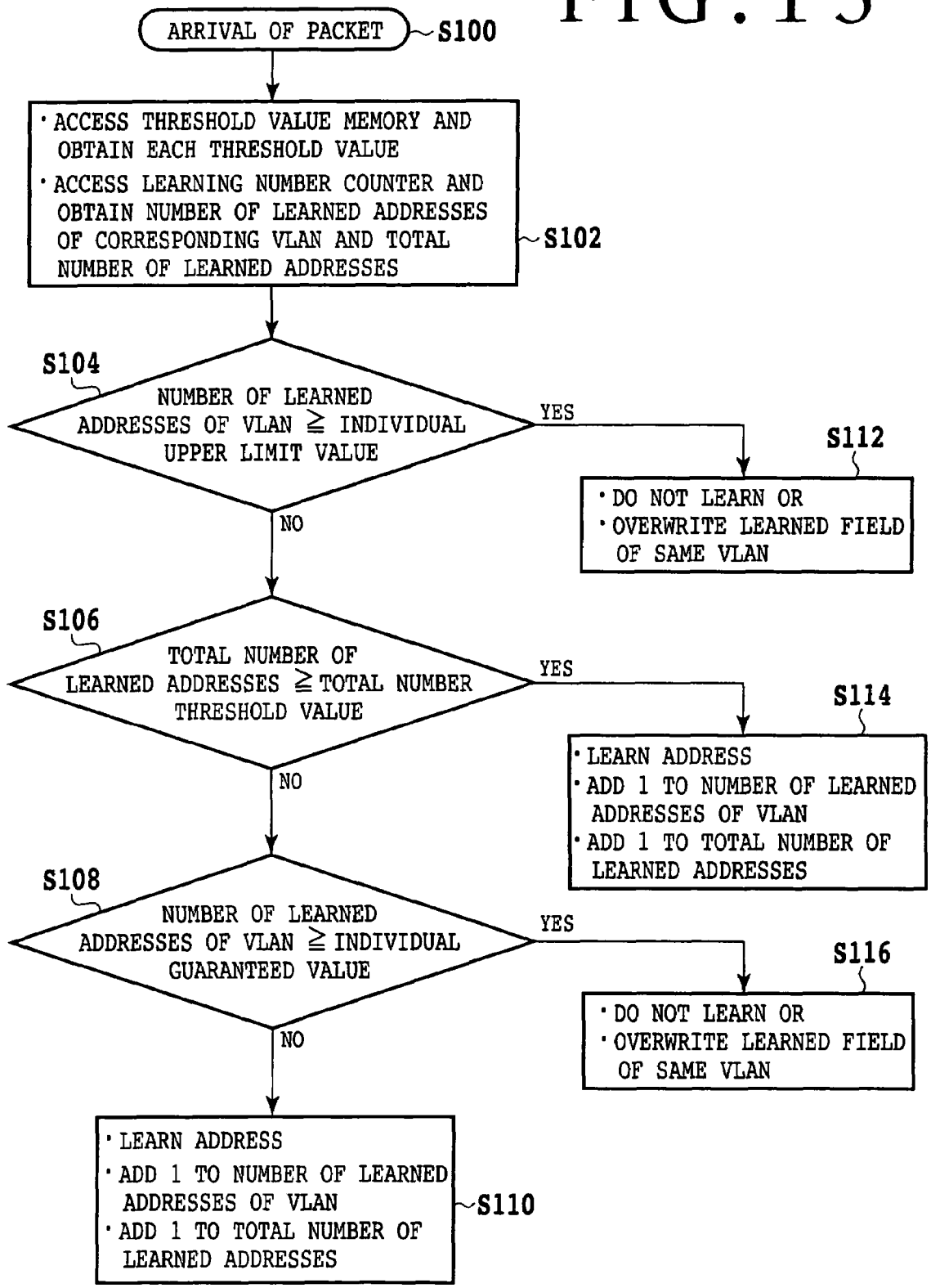
FIG. 15 is a flowchart of processing of an SA learning unit in FIG. 13.

FIG. 15 is a flowchart of operation of an SA learning unit 454. Suppose that at a step S100, a packet arrives at a port of the L2SW. At a step S102, the SA learning unit 454 (i) accesses the threshold value memory 450 to obtain the individual upper limit value, the individual guaranteed value, and the general threshold value, and (ii) accesses a learning number counter 452 to obtain a number of learned addresses of the VLAN of the packet and a total number of learned addresses. At a step S104, the SA learning unit 454 compares the number of learned addresses of the VLAN with the individual upper limit value. When the number of learned addresses of the VLAN is less than the individual upper limit value, the SA learning unit 454 proceeds to a step S106. When the number of learned addresses of the VLAN is equal to or more than the individual upper limit value, the SA learning unit 454 proceeds to a step S112. At the step S106, the SA learning unit 454 compares the total number of learned addresses with the total number threshold value. When the total number of learned addresses is equal to or more than the total number threshold value, the SA learning unit 454 proceeds to a step S108. When the total number of learned addresses is less than the total number threshold value, the SA learning unit 454 proceeds to a step S114. At the step S108, the SA learning unit 454 compares the number of learned addresses of the VLAN of the packet with the individual guaranteed value. When the number of learned addresses of the VLAN is equal to or less than the individual guaranteed value, the SA learning unit 454 proceeds to a step S110. When the individual upper limit value is less than the number of learned addresses of the VLAN, the SA learning unit 454 proceeds to a step S116. At the step S110, the SA learning unit 454 (i) learns the SA address of the packet in the FDB 104, (ii) adds 1 to the number of learned addresses of the VLAN in the learning number counter 452, and (iii) adds 1 to the total number of learned addresses in the learning number counter 452.

At the step S112, the SA learning unit 454 (i) does not learn the address, or (ii) overwrites a learned field for the same VLAN. At the step S114, the SA learning unit 454 learns the SA address of the packet in the FDB 104, and (ii) adds 1 to the number of learned addresses of the VLAN. At the step S116, the SA learning unit 454 (i) does not learn the address, or (ii) overwrites a learned field for the same VLAN.

When no update is performed within a certain time with respect to an address learned in the FDB 104, an aging processing unit 456 (i) erases the address from the FDB 104, (ii) subtracts 1 from the number of learned addresses for the VLAN ID of the address in the learning number counter 452, and (iii) subtracts 1 from the total number of learned addresses in the learning number counter 452.

As described above, a minimum guaranteed amount is set for an amount of use of the address learning table by a user group and its total amount is allowed to be occupied by each of user groups set in advance as a reservation number. A remaining unreserved area is shared by all user groups. Setting is made such that a number obtained by adding together a sum of reserved table spaces and the table space shared by all the user groups does not exceed the total table space. Thereby a minimum space of the address learning table can be guaranteed for each user group.

Eighth Embodiment

Figure 16:
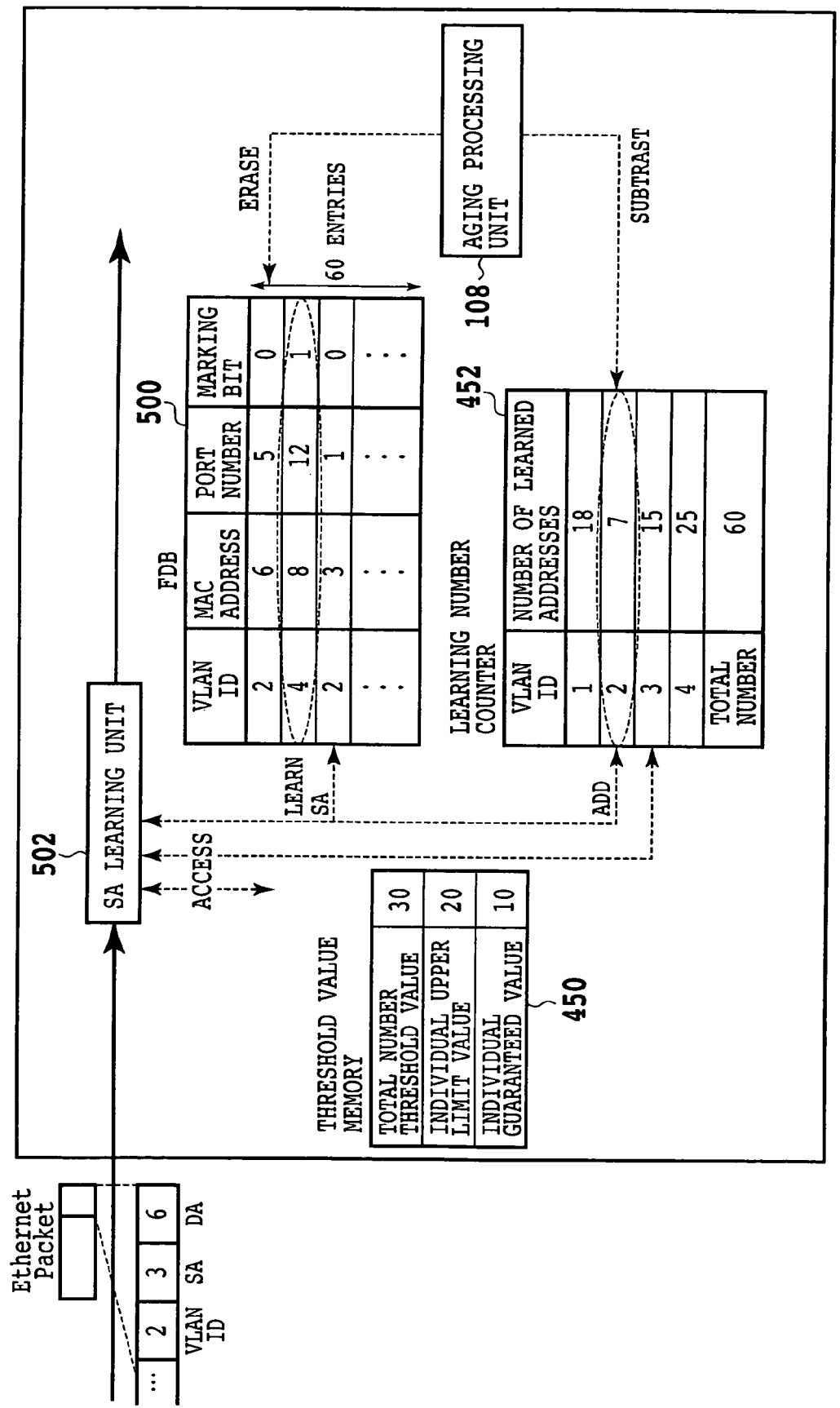
FIG. 16 is a diagram of configuration of an L2SW according to an eighth embodiment of the present invention.

FIG. 16 is a diagram of configuration related to MAC address learning of an L2SW according to an eighth embodiment of the present invention. Substantially the same components as the components in FIG. 13 are identified by the same reference numerals. An FDB 500 is provided with fields for marking bits in addition to fields of each record of the FDB 104. In the seventh embodiment, when a requirement of each user group is still less than the minimum guaranteed value, the unused reserved space cannot be used by another user group. Accordingly, in order to allow another user group to use the reserved table space, learned addresses as an excess over the guaranteed number are marked. When there is a sufficient table space, use of a table space exceeding the guaranteed value is allowed. When the table space is exhausted, a user group not yet using the table up to the guaranteed number is given priority by overwriting the marked address learning area.

Figure 17:
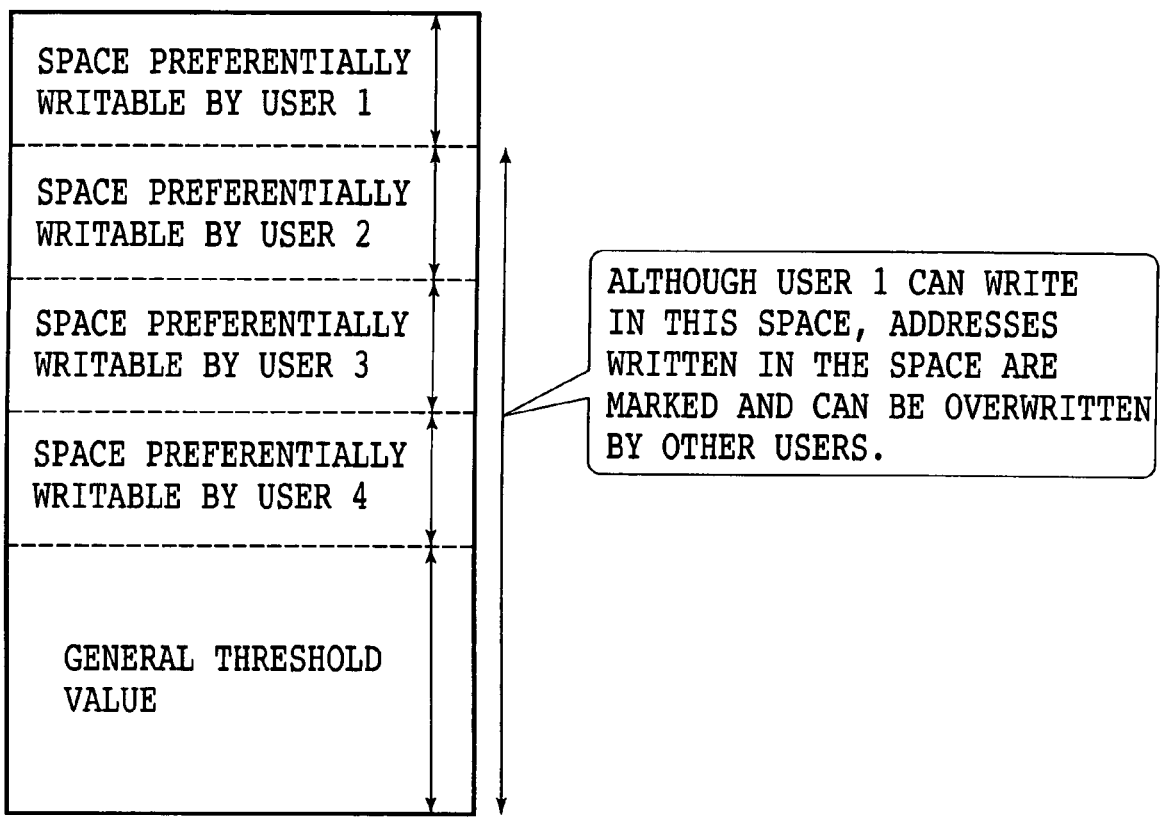
FIG. 17 is a conceptual diagram of use of an FDB.

FIG. 17 is a conceptual diagram of use of the FDB 500. As shown in FIG. 17, a space corresponding to an individual guaranteed value is secured as a space for each user group to preferentially write in. Each user group can write in spaces corresponding to a general threshold value and secured for the other user groups when the space secured for the user group is used. However, addresses written in the spaces are marked and can be overwritten by the other user groups.

Figure 18:
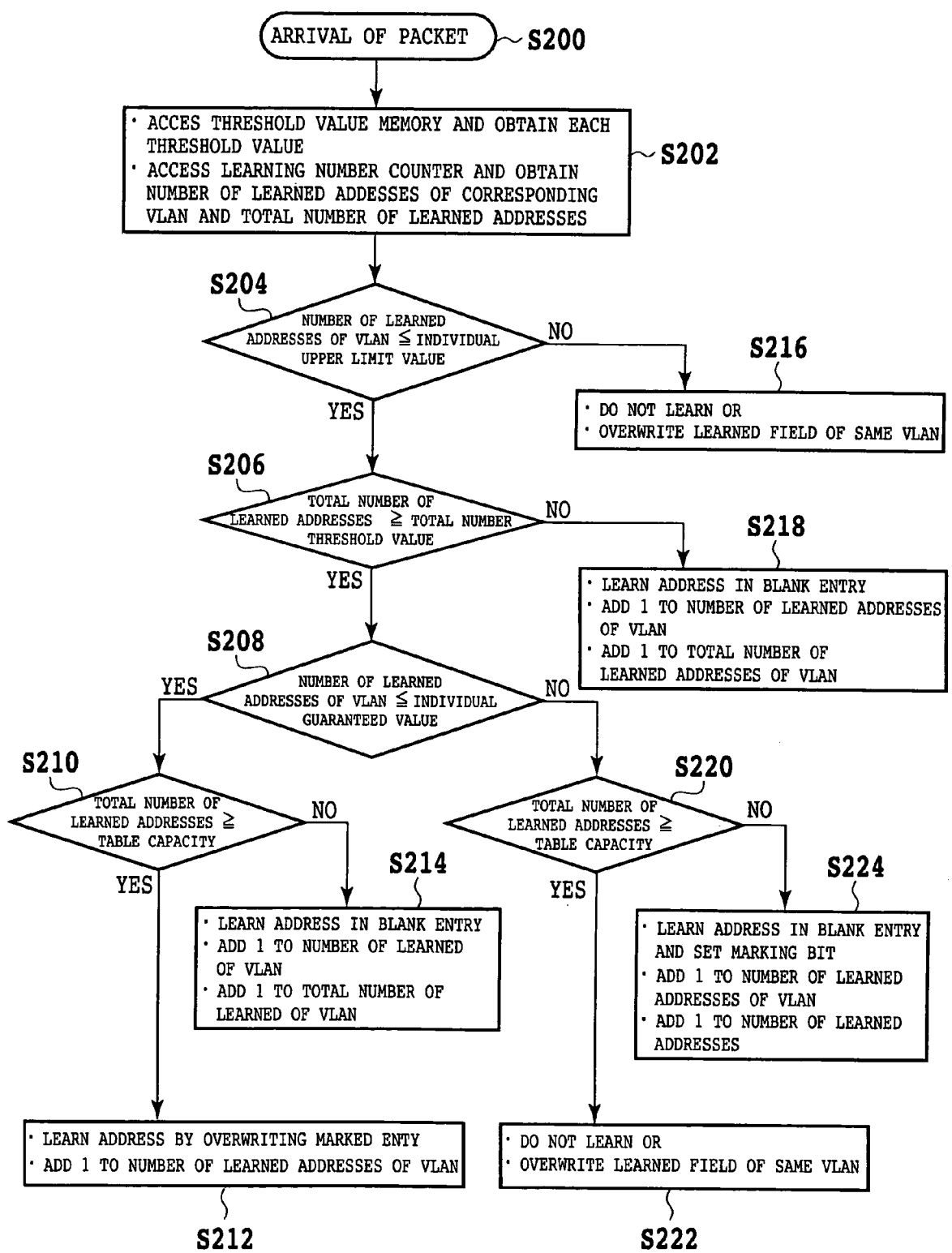
FIG. 18 is a flowchart of processing of an SA learning unit in FIG. 16.

FIG. 18 is a flowchart of operation of an SA learning unit 502. Suppose that at a step S200, a packet arrives at a port of the L2SW. At a step S202, the SA learning unit 502 (i) accesses a threshold value memory 450 to obtain an individual upper limit value, an individual guaranteed value, and a general threshold value, and (ii) accesses a learning number counter 452 to obtain a number of learned addresses of the VLAN of the packet and a total common number of learned addresses. At a step S204, the SA learning unit 502 compares the number of learned addresses of the VLAN with the individual upper limit value. When the number of learned addresses of the VLAN is equal to or less than the individual upper limit value, the SA learning unit 502 proceeds to a step S206. When the individual upper limit value is less than the number of learned addresses of the VLAN, the SA learning unit 502 proceeds to a step S216. At the step S206, the SA learning unit 502 compares the total number of learned addresses with the total number threshold value. When the total number of learned addresses is equal to or more than the total number threshold value, the SA learning unit 502 proceeds to a step S208. When the total number of learned addresses is less than the total number threshold value, the SA learning unit 502 proceeds to a step S218. At the step S208, the SA learning unit 502 compares the number of learned addresses of the VLAN of the packet with the individual guaranteed value. When the number of learned addresses of the VLAN is equal to or less than the individual guaranteed value, the SA learning unit 502 proceeds to a step S210. When the individual guaranteed value is less than the number of learned addresses of the VLAN, the SA learning unit 502 proceeds to a step S220.

At the step S210, the SA learning unit 502 compares the total number of learned addresses with a table capacity of the FDB 500. When the total number of learned addresses is equal to or more than the table capacity, the SA learning unit 502 proceeds to a step S212. When the total number of learned addresses is less than the table capacity, the SA learning unit 502 proceeds to a step S214. At the step S212, the SA learning unit 502 (i) overwrites a marked entry in the FDB 500 to learn an address, (ii) adds 1 to the number of learned addresses of the VLAN of the packet in the learning number counter 452, and (iii) subtracts 1 from the number of learned addresses of the VLAN whose entry is overwritten in the learning number counter 452.

At the step S214, the SA learning unit 502 (i) learns the address in a blank entry in the FDB 500, (ii) adds 1 to the number of learned addresses of the VLAN of the packet in the learning number counter 452, and (iii) adds 1 to the total number of learned addresses in the learning number counter 452. At the step S216, the SA learning unit 502 (i) does not learn the address, or (ii) overwrites a learned field for the same VLAN. At the step S218, the SA learning unit 502 (i) learns the SA address of the packet in a blank entry in the FDB 500, (ii) adds 1 to the number of learned addresses of the VLAN of the packet in the learning number counter 452, and (iii) adds 1 to the total number of learned addresses in the learning number counter 452.

At the step S220, the SA learning unit 502 compares the total number of learned addresses with the table capacity of the FDB 500. When the total number of learned addresses is equal to or more than the table capacity of the FDB 500, the SA learning unit 502 proceeds to a step S222. When the total number of learned addresses is less than the table capacity of the FDB 500, the SA learning unit 502 proceeds to a step S224. At the step S222, the SA learning unit 502 (i) does not learn the address, or (ii) overwrites a learned field for the same VLAN. At the step S224, the SA learning unit 502 (i) learns the SA address of the packet in a blank entry in the FDB 500, (ii) sets a marking bit for the SA address, (iii) adds 1 to the number of learned addresses of the VLAN in the learning number counter 452, and (iv) adds 1 to the total number of learned addresses in the learning number counter 452.

As described above, a sum of reserved numbers can be increased to such an extent as to coincide with the total table capacity, and a blank table space can be shared to a maximum between user groups.

Ninth Embodiment

Figure 19:
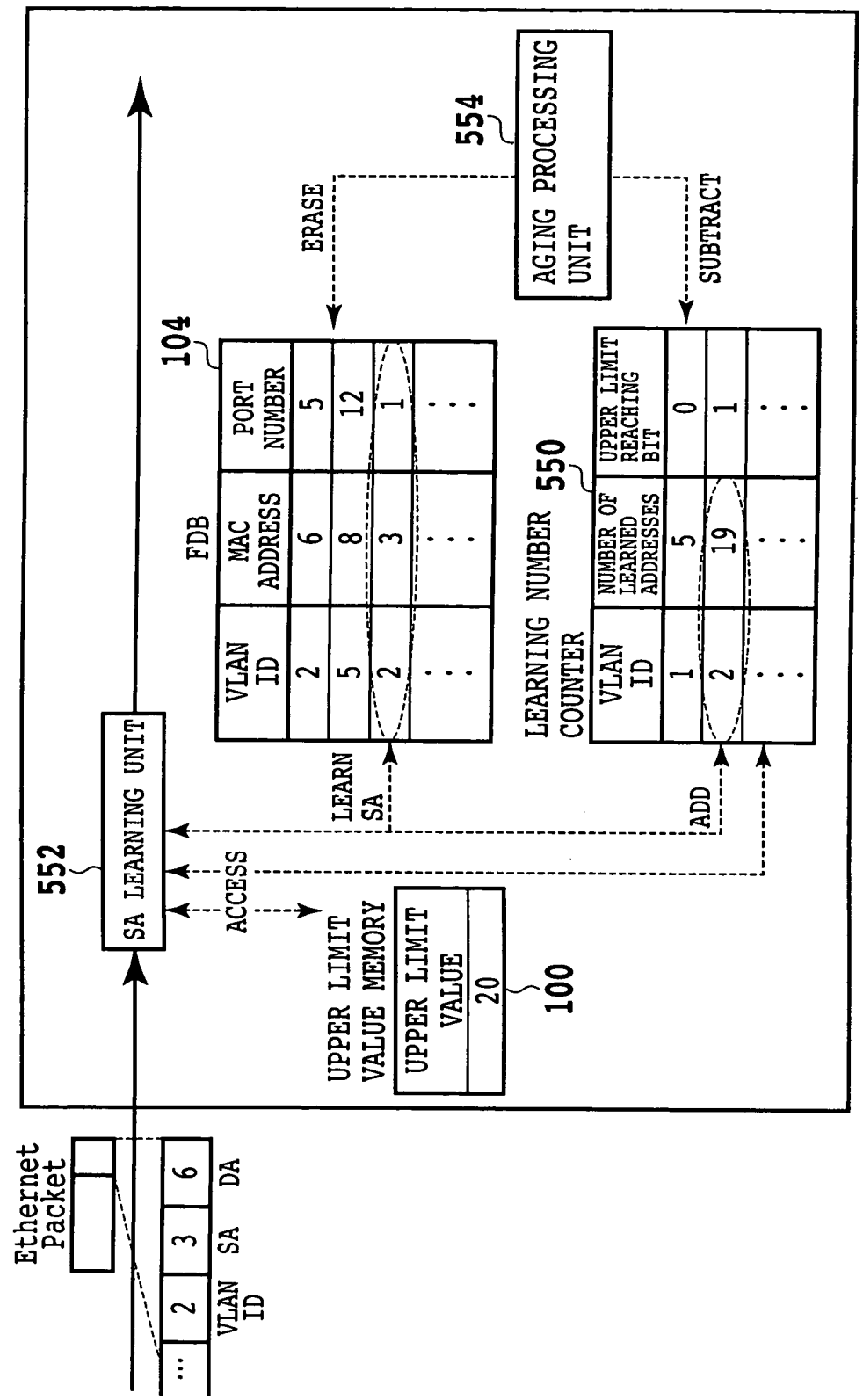
FIG. 19 is a diagram of configuration of an L2SW according to a ninth embodiment of the present invention.

FIG. 19 is a diagram of configuration related to MAC address learning of an L2SW according to a ninth embodiment of the present invention. Substantially the same components as the components in FIG. 3 are identified by the same reference numerals. A learning number counter 550 is provided with fields for an upper limit reaching bit in addition to fields of each record of the learning number counter 102 in FIG. 3. The upper limit value reaching bit is set when a number of learned addresses of a VLAN reaches an upper limit value.

Figure 20:
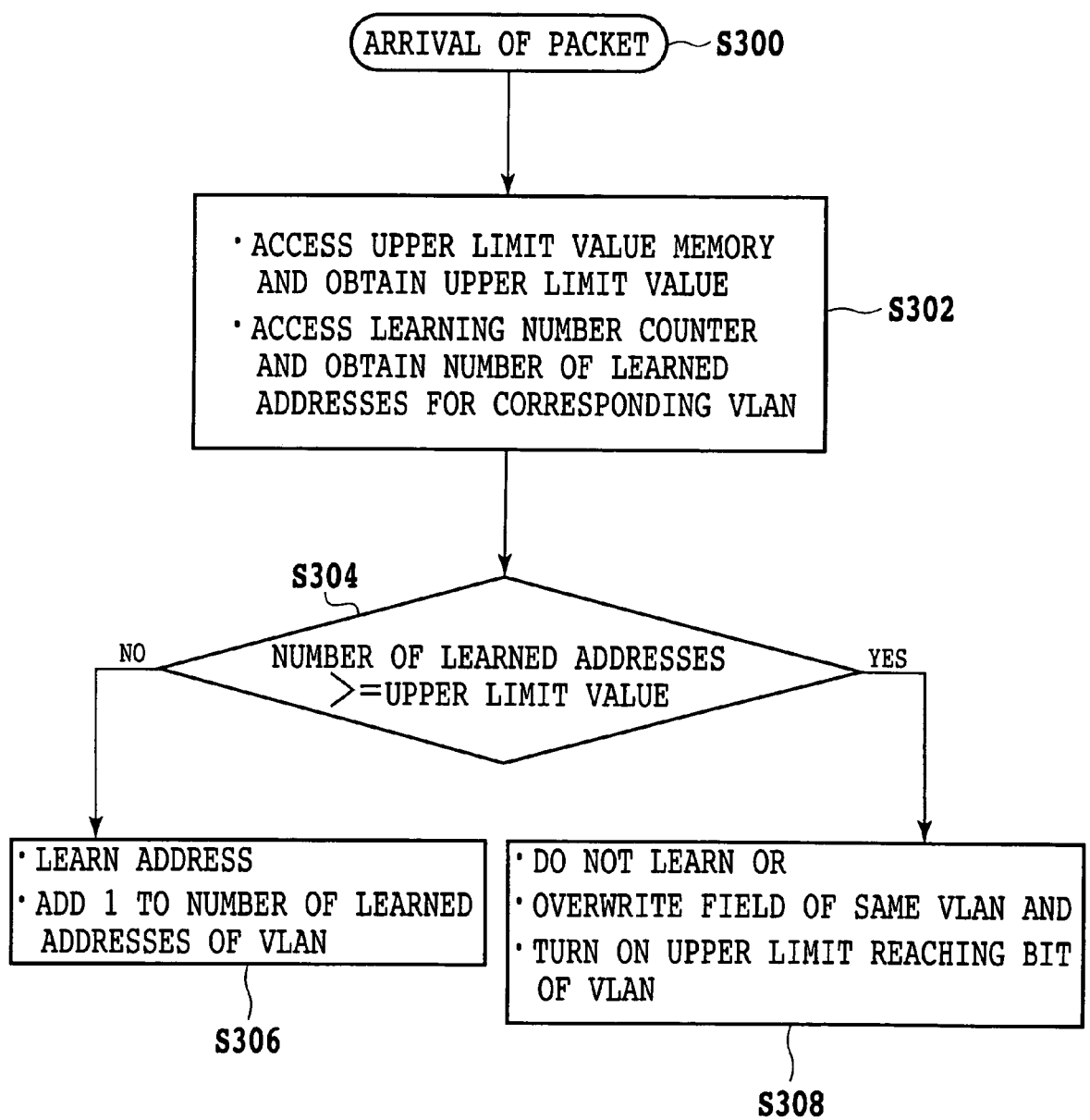
FIG. 20 is a flowchart of processing of an SA learning unit in FIG. 19.

FIG. 20 is a flowchart of an SA learning unit 552. Operation of the SA learning unit 552 will be described in the following with reference to FIG. 20. Processing from a step S300 to a step S306 is similar to the processing from the step S2 to the step S8 in FIG. 4. At a step S308, the SA learning unit 552 (i) does not learn the new SA or (ii) overwrites a learned address of the same VLAN ID with the new address and turns on an upper limit reaching bit for the VLAN in the learning number counter 550. When no update is performed within a certain time with respect to an address learned in an FDB 104, an aging processing unit 554 (i) erases the address from the FDB 104, (ii) subtracts 1 from the number of learned addresses for the VLAN of the address in the learning number counter 550, and (iii) turns off an upper limit reaching bit when the number of learned addresses for the VLAN of the address becomes less than the upper limit value.

As described above, in addition to similar effects to those of the first embodiment, since the upper limit reaching bit is provided in the learning number counter, the ninth embodiment enables states of table space requirement to be grasped and is able to provide reference statistical data for optimum setting of the upper limit value.

Tenth Embodiment

Figure 21:
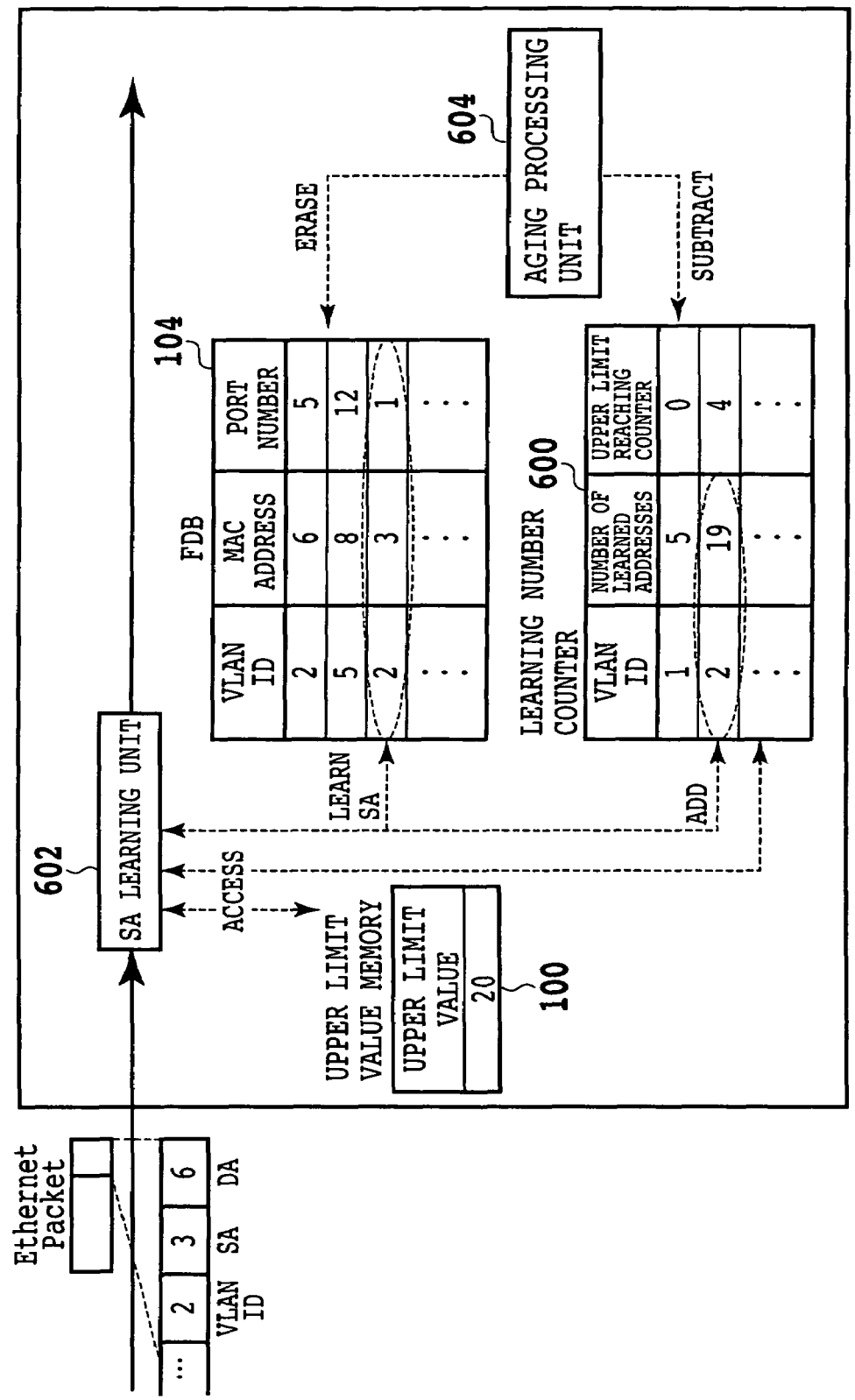
FIG. 21 is a diagram of configuration of an L2SW according to a tenth embodiment of the present invention.

FIG. 21 is a diagram of configuration related to MAC address learning of an L2SW according to a tenth embodiment of the present invention. Substantially the same components as the components in FIG. 3 are identified by the same reference numerals. A learning number counter 600 is provided with fields for an upper limit reaching counter in addition to fields of each record of the learning number counter 102 in FIG. 3. The upper limit value reaching counter is incremented each time a number of learned addresses of a VLAN reaches an upper limit value.

FIG. 22 is a flowchart of an SA learning unit 602. Operation of the SA learning unit 602 will be described in the following with reference to FIG. 22. Processing from a step S400 to a step S406 is similar to the processing from the step S2 to the step S8 in FIG. 4. At a step S408, the SA learning unit 552 (i) does not learn the new SA or (ii) overwrites a learned address of the same VLAN ID with the new address and adds 1 to an upper limit reaching counter for the VLAN in the learning number counter 600. When no update is performed within a certain time with respect to an address learned in an FDB 104, an aging processing unit 604 (i) erases the address from the FDB 104, and (ii) subtracts 1 from the number of learned addresses for the VLAN of the address in the learning number counter 600.

As described above, in addition to similar effects to those of the first embodiment, since the upper limit reaching counter is provided in the learning number counter, the tenth embodiment enables states of table space requirement to be grasped and is able to provide reference statistical data for optimum setting of the upper limit value.

As described above, according to the present invention, it is possible to set a limit to use of an address learning table by each user group. While flooding occurs frequently and therefore packet delivery performance is degraded within a virtual private network to which a user group no longer able to register a new address belongs, another user group can register a new address, so that occurrence of flooding is suppressed and therefore performance of the network is not degraded or degradation in the performance is reduced. It is thus possible to provide fairness in service quality between a plurality of user groups using a public network.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A switching apparatus for learning a source address set in a packet in an address learning table and delivering a packet on the basis of an address learned in said address learning table, said switching apparatus comprising:

an address learning unit for limiting a number of learned addresses such that a number of learned addresses in said address learning table for each of user groups which are classified into a plurality of groups based on header information set in said packet is equal to or less than an address learning upper limit value for said user group; and a learning number counter for storing a number of learned addresses for each user group of said plurality of said user groups in said address learning table, wherein said address learning upper limit value is set for each user group, and said address learning unit limits the number of learned addresses of a user group judged based on a header information of a received packet in said plurality of user groups in said address learning table and updates the number of learned addresses of the user group in the learning number counter when the number of learned addresses for the user group does not exceed the address upper limit.

2. The switching apparatus as claimed in claim 1, wherein said address learning unit assigns a fixed said address learning upper limit value to each user group.

3. The switching apparatus as claimed in claim 2,
wherein said address learning unit sets a value for equally allocating a maximum number of addresses learnable in said address learning table to all user groups as said address learning upper limit value for each user group.

4. The switching apparatus as claimed in claim 2,
wherein said address learning unit sets a fixed value greater than a value for equally allocating a maximum number of addresses learnable in said address learning table to all user groups as said address learning upper limit value for each user group.

5. The switching apparatus as claimed in claim 1,
wherein said address learning unit dynamically calculates a value for equally allocating a maximum number of addresses learnable in said address learning table to user groups currently learned in said address learning table and sets said value as said address learning upper limit value.

6. The switching apparatus as claimed in claim 2,
wherein said address learning unit sets said address learning upper limit value for each user group on the basis of subscription managing information for each user group.

7. A switching apparatus for learning a source address set in a packet in an address learning table and delivering a packet on the basis of an address learned in said address learning table, said switching apparatus comprising:
an address learning unit for limiting a number of learned addresses such that a number of learned addresses in said address learning table for each user group which are classified into a plurality of groups based on header information set in said packet is equal to or less than an address learning upper limit value for said user group; and
a learning number counter for storing a number of learned addresses for each user group of said plurality of said user groups in said address learning table,
wherein said address learning unit limits the number of learned addresses of a user group judged based on a header information of a received packet in said plurality of user groups in said address learning table and updates the number of learned addresses of the user group in the learning number counter when the number of learned addresses for the user group does not exceed the address upper limit, and
said address learning unit assigns a fixed said address learning upper limit value to each user group and assigns a fixed said address learning upper limit value to each user group, said address learning unit sets said address learning upper limit value for each user group on the basis of subscription managing information for each user group, said subscription managing information is a subscription band of each user group, and said address learning upper limit value is weighted according to the subscription band of each user group.

8. A switching apparatus for learning a source address set in a packet in an address learning table and delivering a packet on the basis of an address learned in said address learning table, said switching apparatus comprising:
an address learning unit for limiting a number of learned addresses such that a number of learned addresses in said address learning table for each user group which are classified into a plurality of groups based on header information set in said packet is equal to or less than an address learning upper limit value for said user group; and
a learning number counter for storing a number of learned addresses for each user group of said plurality of said user groups in said address learning table,
wherein said address learning unit limits the number of learned addresses of a user group judged based on a header information of a received packet in said plurality of user groups in said address learning table and updates the number of learned addresses of the user group in the learning number counter when the number of learned addresses for the user group does not exceed the address upper limit,
said address learning unit assigns a fixed said address learning upper limit value to each user group,
said address learning unit sets said address learning upper limit value for each user group on the basis of subscription managing information for each user group, and
said subscription managing information is a number of subscribing locations of each user group, and said address learning upper limit value is weighted according to the number of subscribing locations of each user group.

9. The switching apparatus as claimed in claim 1,
wherein said address learning unit does not learn a new address of a user group whose number of learned addresses has reached said address learning upper limit value.

10. The switching apparatus as claimed in claim 1,
wherein said address learning unit overwrites an address learned in said address learning table for a user group whose number of learned addresses has reached said address learning upper limit value with a new address of said user group.

11. The switching apparatus as claimed in claim 10,
wherein said address learning unit overwrites an address that is learned in said address learning table for a user group whose number of learned addresses has reached said address learning upper limit value and is set in an oldest arrived packet of said user group with a new address of said user group.

12. A switching apparatus for learning a source address set in a packet in an address learning table and delivering a packet on the basis of an address learned in said address learning table, said switching apparatus comprising:
an address learning unit for limiting a number of learned addresses on the basis of a total number threshold value which is based on a number of learnable addresses by using memory of said address learning table shared with all of said user groups and an individual guaranteed value set for each of user groups which are classified into a plurality of groups based on header information set in said packet by using memory of said address learning table for guaranteeing an individual guaranteed value of each user group, so as not to allow increase in a number of learned addresses for a user group which number in said address learning table exceeds said individual guaranteed value when a total number of learned addresses learned in said address learning table reaches said total number threshold value; and
a learning number counter for storing a number of learned addresses for each user group of said plurality of said user groups in said address learning table,
wherein said address learning unit limits the number of learned addresses of a user group judged based on a header information of a received packet in said plurality of user groups in said address learning table and updates the number of learned addresses of the user group in the learning number counter when the number of learned addresses for the user group does not exceed the address upper limit.

13. The switching apparatus as claimed in claim 12, wherein said individual guaranteed value is identical for all said user groups, and a value obtained by adding together a value obtained by multiplying a value obtained by subtracting 1 from a total number of user groups by said individual guaranteed value and said total number threshold value does not exceed a maximum number of addresses learnable in said address learning table.

14. A switching apparatus for learning a source address set in a packet in an address learning table and delivering a packet on the basis of an address learned in said address learning table, said switching apparatus comprising:

an address learning unit for, on the basis of a total number threshold value which is based on a number of learnable addresses by using memory of said address learning table shared with all of said user groups and an individual guaranteed value set for each of user groups which are classified into a plurality of groups based on header information set in said packet by using memory of said address learning table for guaranteeing an individual guaranteed value of each user group, marking an address learned in said address learning table for a user group whose number of learned addresses exceeds said individual guaranteed value at a time of learning the new address, and overwriting the marked address with a new address of a user group whose number of learned addresses is less than said individual guaranteed value when a total number of currently learned addresses reaches a maximum number of addresses learnable in said address learning table; and a learning number counter for storing a number of learned addresses for each user group of said plurality of said user groups in said address learning table, wherein said address learning unit limits the number of learned addresses of a user group judged based on a header information of a received packet in said plurality of user groups in said address learning table and updates the number of learned addresses of the user group in the learning number counter when the number of learned addresses for the user group does not exceed the address upper limit.

15. A switching apparatus for learning a source address set in a packet in an address learning table and delivering a packet on the basis of an address learned in said address learning table, said switching apparatus comprising:

an address learning unit for limiting a number of learned addresses such that a number of learned addresses for each of user groups which are classified into a plurality of groups based on header information set in said packet in said address learning table is equal to or less than an address learning upper limit value for said user group; and a learning number counter for storing a number of learned addresses for each user group of said plurality of said user groups in said address learning table, wherein said address learning unit limits the number of learned addresses of a user group judged based on a header information of a received packet in said plurality of user groups in said address learning table and updates the number of learned addresses of the user group in the learning number counter when the number of learned addresses for the user group does not exceed the address upper limit, and when a packet with a new address arrives, said address learning unit records occurrence of an event in which a number of learned addresses for a user group of the source address of said packet reaches said address learning upper limit value for said user group.

16. The switching apparatus as claimed in claim 1, wherein when a packet with a new address arrives, said address learning unit counts a number of events in which a number of learned addresses for a user group of the source address of said packet reaches said address learning upper limit value for said user group.

17. The switching apparatus as claimed in claim 1, wherein said address learning unit records the number of addresses learned in said address learning table for each said user group in a learning number counter.

* * * * *